United States Patent
Wissmann et al.

(10) Patent No.: US 10,928,310 B2
(45) Date of Patent: Feb. 23, 2021

(54) METHODS AND APPARATUS FOR IMAGING A SPECIMEN CONTAINER AND/OR SPECIMEN USING MULTIPLE EXPOSURES

(71) Applicant: Siemens Healthcare Diagnostics Inc., Tarrytown, NY (US)

(72) Inventors: Patrick Wissmann, Munich (DE); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 49 days.

(21) Appl. No.: 16/072,431

(22) PCT Filed: Jan. 24, 2017

(86) PCT No.: PCT/US2017/014778
§ 371 (c)(1),
(2) Date: Jul. 24, 2018

(87) PCT Pub. No.: WO2017/132172
PCT Pub. Date: Aug. 3, 2017

(65) Prior Publication Data
US 2019/0041318 A1 Feb. 7, 2019

Related U.S. Application Data

(60) Provisional application No. 62/288,387, filed on Jan. 28, 2016.

(51) Int. Cl.
*G01N 21/31* (2006.01)
*G01N 21/25* (2006.01)
(Continued)

(52) U.S. Cl.
CPC ............ *G01N 21/31* (2013.01); *G01N 15/05* (2013.01); *G01N 21/253* (2013.01); *G01N 21/90* (2013.01);
(Continued)

(58) Field of Classification Search
CPC ...... G01N 21/31; G01N 21/253; G01N 21/90; G01N 15/05; G01N 35/00584; G01N 2035/00752; G01N 2201/0627
See application file for complete search history.

(56) References Cited

U.S. PATENT DOCUMENTS 1,459,040 A   6/1923   Vincent
5,523,786 A * 6/1996   Parulski .............. H04N 5/2256
                                                   348/221.1
(Continued)

FOREIGN PATENT DOCUMENTS

CN   102753957 A   10/2012
CN   104007067 A   8/2014
(Continued)

OTHER PUBLICATIONS

Associated Press, "Hess Stations to Be Renamed, But Toy Trucks Roll On" https://www.nbcnews.com/business/energy/hess-stations-be-renamed-toy-trucks-roll-n112256, May 22, 2014 (Year: 2014).*
(Continued)

*Primary Examiner* — Maurice C Smith

(57) ABSTRACT

A method of imaging a specimen container and/or specimen. The method includes providing a specimen container containing a specimen at an imaging location, providing one or more cameras configured to capture images at the imaging location, providing one or more light sources adjacent to the imaging location, illuminating the imaging location with the one or more light sources, and capturing multiple images including: specimen images of the image location at mul-
(Continued)

tiple different exposures, with the specimen container and specimen being present at the image location. Quality check modules and specimen testing apparatus including a quality check module are described herein, as are other aspects.

24 Claims, 12 Drawing Sheets

(51) Int. Cl.
*G01N 15/05* (2006.01)
*G01N 21/90* (2006.01)
*G01N 15/00* (2006.01)
*G01N 35/00* (2006.01)

(52) U.S. Cl.
CPC .......... *G01N 2015/0065* (2013.01); *G01N 2035/00752* (2013.01); *G01N 2201/0627* (2013.01)

(56) References Cited

U.S. PATENT DOCUMENTS

| | | | |
|---|---|---|---|
| 5,876,107 A | 3/1999 | Parker et al. | |
| 6,072,914 A | 6/2000 | Mikuni | |
| 6,353,471 B1 | 3/2002 | Samsoondar et al. | |
| 6,866,823 B2 | 3/2005 | Wardlaw | |
| 7,422,693 B2 | 9/2008 | Carter et al. | |
| 7,663,738 B2 | 2/2010 | Johansson | |
| 7,771,659 B2 | 8/2010 | Ziegler | |
| 8,064,061 B2 | 11/2011 | Yamamoto et al. | |
| 8,188,878 B2 | 5/2012 | Pederson et al. | |
| 8,194,235 B2 | 6/2012 | Kosaka et al. | |
| 8,310,658 B2 | 11/2012 | Wardlaw et al. | |
| 8,318,094 B1 | 11/2012 | Bayandorian et al. | |
| 8,380,444 B2 | 2/2013 | Kim et al. | |
| 8,381,581 B2 | 2/2013 | Walsh et al. | |
| 8,859,289 B2 | 10/2014 | Marty et al. | |
| 9,017,610 B2 | 4/2015 | Winkelman et al. | |
| 9,322,761 B2 | 4/2016 | Miller et al. | |
| 2001/0004285 A1 | 7/2001 | Cadell et al. | |
| 2003/0002024 A1* | 1/2003 | Motegi | G03B 27/72 355/69 |
| 2004/0206419 A1* | 10/2004 | Ganz | B01L 9/523 506/18 |
| 2005/0141058 A1* | 6/2005 | Raynor | G01N 21/253 358/504 |
| 2007/0085996 A1 | 4/2007 | Mangan et al. | |
| 2008/0019584 A1 | 1/2008 | Lindberg et al. | |
| 2008/0094617 A1* | 4/2008 | Diehr | B07C 5/126 356/240.1 |
| 2008/0174768 A1* | 7/2008 | Belz | C07D 209/42 356/73 |
| 2009/0159812 A1 | 6/2009 | Livingston | |
| 2009/0324032 A1 | 12/2009 | Chen | |
| 2010/0291588 A1 | 11/2010 | McDevitt et al. | |
| 2011/0267450 A1 | 11/2011 | Pronkine | |
| 2011/0267458 A1* | 11/2011 | Kubo | A61B 1/00009 348/135 |
| 2012/0140230 A1* | 6/2012 | Miller | G01N 15/042 356/441 |
| 2013/0076882 A1 | 3/2013 | Itoh | |
| 2014/0161330 A1 | 6/2014 | Allan et al. | |
| 2014/0193050 A1 | 7/2014 | Miller | |
| 2014/0267672 A1 | 9/2014 | Morrison et al. | |
| 2014/0293036 A1 | 10/2014 | Ddecaux et al. | |
| 2015/0124300 A1* | 5/2015 | Depalov | H04N 1/48 358/509 |
| 2015/0215295 A1* | 7/2015 | Lord | H04B 10/1141 380/270 |
| 2015/0285731 A1* | 10/2015 | Haghgooie | G01N 21/03 356/440 |
| 2016/0191158 A1* | 6/2016 | Aoyama | H04B 10/54 398/172 |
| 2016/0327433 A1* | 11/2016 | Margalit | G01J 3/0264 |
| 2016/0334340 A1* | 11/2016 | Ollivier | G01N 21/90 |
| 2017/0048494 A1* | 2/2017 | Boyle | H04N 5/2256 |
| 2017/0069098 A1* | 3/2017 | Johannesson | G06T 7/593 |

FOREIGN PATENT DOCUMENTS

| | | |
|---|---|---|
| EP | 1459040 B1 | 9/2004 |
| EP | 1186893 B1 | 1/2008 |
| EP | 1967840 A2 | 9/2008 |
| JP | 2008-510971 A | 4/2008 |
| JP | 2009-014602 A | 1/2009 |
| JP | 2013-501937 A | 1/2013 |
| WO | 0036400 A1 | 6/2000 |
| WO | 2008/142842 A1 | 11/2008 |
| WO | 2014/138533 A1 | 9/2014 |

OTHER PUBLICATIONS

Extended EP Search Report dated Nov. 27, 2018 of corresponding European Application No. 17744783.6, 10 Pages.
PCT International Search Report and Written Opinion dated Apr. 10, 2017 (10 Pages).

* cited by examiner

METHODS AND APPARATUS FOR IMAGING A SPECIMEN CONTAINER AND/OR SPECIMEN USING MULTIPLE EXPOSURES

RELATED APPLICATION

This application claims priority to U.S. Provisional Patent Application Ser. No. 62/288,387 entitled "METHODS AND APPARATUS FOR IMAGING A SPECIMEN CONTAINER AND/OR SPECIMEN" filed on Jan. 28, 2016, the disclosure of which is hereby incorporated by reference in its entirety herein.

FIELD

The present invention relates to methods and apparatus for testing of a biological specimen, and, more particularly to methods and apparatus for imaging a specimen and/or specimen container.

BACKGROUND

Automated testing systems may conduct clinical chemistry or assays using one or more reagents to identify an analyte or other constituent in a specimen such as urine, blood serum, blood plasma, interstitial liquid, cerebrospinal liquids, and the like. For various reasons, these specimens may be contained in specimen containers (e.g., blood collection tubes). The assay or test reactions may generate various changes that may be read and/or otherwise manipulated to determine a concentration of analyte or other constituent in the specimen.

Improvements in automated testing technology have been accompanied by corresponding advances in pre-analytical sample preparation and handling operations such as batch preparation, centrifugation of specimen to separate specimen constituents, cap removal to facilitate specimen access, and the like by automated pre-analytical specimen preparation systems, which may be part of a Laboratory Automation System (LAS). The LAS may automatically transport the specimens contained in specimen containers and as carried on carriers to a number of pre-analytical specimen processing stations as well as to analytical stations containing clinical chemistry analyzers and/or assay instruments (collectively referred herein to as "analyzers").

LASs may handle any number of different specimens contained in barcode-labeled specimen containers at one time. The LAS may handle all different sizes and types of specimen containers, and they may also be intermingled. The barcode label may contain an accession number that may be correlated to demographic information that may be entered into a hospital's Laboratory Information System (LIS), along with test orders and other information. An operator may place the barcode-labeled specimen containers onto the LAS system, such as on a track, which may automatically transport the specimen containers for pre-analytical operations such as centrifugation, decapping, aliquot preparation, and the like; all prior to the specimen actually being subjected to clinical analysis or assaying by one or more analyzers that are part of the LAS. In some cases, one or more barcode labels may be adhered to the specimen container such that they may obscure views of the specimen from at least some viewpoints.

For certain tests, an amount of a serum or plasma portion of the specimen obtained from whole blood by fractionation (e.g., centrifugation) may be aspirated and used. A gel separator may be added to the specimen container to aid in the separation of a settled blood portion from the serum or plasma portion in some cases. After fractionation and decapping, the specimen container may be transported to an appropriate analyzer that may extract, via aspiration, serum or plasma portion from the specimen container and combine it with one or more reagents in a reaction vessel (e.g., cuvette). Analytical measurements may then be performed, often using a beam of interrogating radiation, for example, or by using photometric or fluorometric absorption readings, or the like. The measurements allow for the determination of end-point or rate or other values, from which a concentration of analyte or other constituent may be determined using well-known techniques.

Unfortunately, the presence of certain interferents or artifacts in the specimen, as a result of sample processing or patient disease condition, may possibly adversely affect the accuracy of the test results of the analyte or constituent measurement obtained from the analyzer. For example, the presence of hemolysis, icterus, and/or lipemia (hereinafter HIL) may affect specimen testing results. Likewise, a clot in the specimen (e.g., a blood clot), which may be unrelated to the patient disease state, may cause a different interpretation of the disease condition of the patient. Further, aspiration of a clot may present other problems, such as clogging, contamination, or shut down time for cleaning. Presence of bubbles and/or foam may also cause a different interpretation of the disease condition of the patient via possible aspiration of air by the probe.

In the prior art, the integrity of the serum or plasma portion of the specimen may be visually inspected by a skilled laboratory technician. This may involve a review of the color of the serum or plasma portion of the specimen for the presence of HIL and visual examination for the presence of clots, bubbles, and foam. A normal (hereinafter "N") serum or plasma portion has a light yellow to light amber color, and may be free of clots, bubbles, and foam. However, visual inspection is very subjective, labor intensive, and fraught with the possibility of human error.

Because manual inspection includes the above-listed problems, it is becoming increasingly important to evaluate specimen integrity without using visual inspection by a laboratory technician, but rather by using an automated screening method to the extent practical. The screening method is carried out prior to analysis at an analyzer. However, in some instances, the one or more barcode label(s) adhered directly to the specimen container may partially occlude the view of the specimen, so that there may not be clear opportunity to visually observe the serum or plasma portion of the specimen.

In some systems, such as in U.S. Pat. No. 9,322,761 to Miller, it is described that rotating the specimen container enables the finding of a view window that is unobstructed by the label(s). Imaging may take place upon finding the view window. However, such systems may be less prone to ease of automation.

Because of problems encountered when different sized specimen containers are used, as well as when HIL or an artifact (such as a clot, bubble, or foam) is present in a specimen to be analyzed, and the obstruction caused by the barcode label(s), there is an unmet need for a method and apparatus adapted to readily and automatically image and analyze such specimens. The method and apparatus should not appreciably adversely affect the speed at which analytical or assaying test results are obtained. Furthermore, the method and apparatus should be able to be used even on labeled specimen containers, where one or more labels occlude a view of at least some portion of the specimen.

SUMMARY

According to a first aspect, a method of imaging a specimen container and/or a specimen is provided. The method includes providing a specimen container containing a specimen at an imaging location, providing one or more cameras configured to capture images at the imaging location, providing one or more light sources adjacent to the imaging location, illuminating the imaging location with the one or more light sources, and capturing multiple images including specimen images of the image location at multiple different exposures, with the specimen container and specimen being present at the image location.

According to another aspect, a quality check module is provided. The quality check module includes an imaging location within the quality check module configured to receive a specimen container containing a specimen, one or more cameras arranged at one or more viewpoints adjacent to the imaging location, one or more spectrally-switchable light sources located adjacent the imaging location and configured to provide illumination for the one or more cameras, and a computer configured to cause: the one or more spectrally-switchable light sources to switch between multiple different spectra (e.g., having different nominal wavelengths), and the one or more cameras to capture images at multiple exposures for each of the multiple different spectra.

According to yet another aspect, a specimen testing apparatus is provided. The specimen testing apparatus includes a track, a carrier on the track that is configured to contain a specimen container, a quality check module on the track, the quality check module including: an imaging location within the quality check module configured to receive a specimen container containing a specimen, one or more cameras located at one or more viewpoints adjacent to the imaging location, one or more spectrally-switchable light sources located adjacent the imaging location and configured to provide lighting for the one or more cameras, and a computer configured to cause: the one or more spectrally-switchable light sources to switch between multiple different spectra (e.g., having different nominal wavelengths), and the one or more cameras to capture images at multiple exposures for each of the multiple different spectra.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the appended claims.

BRIEF DESCRIPTION OF THE DRAWINGS

The drawings, described below, are for illustrative purposes only and are not necessarily drawn to scale. The drawings are not intended to limit the scope of the invention in any way.

DETAILED DESCRIPTION

Figure 1:
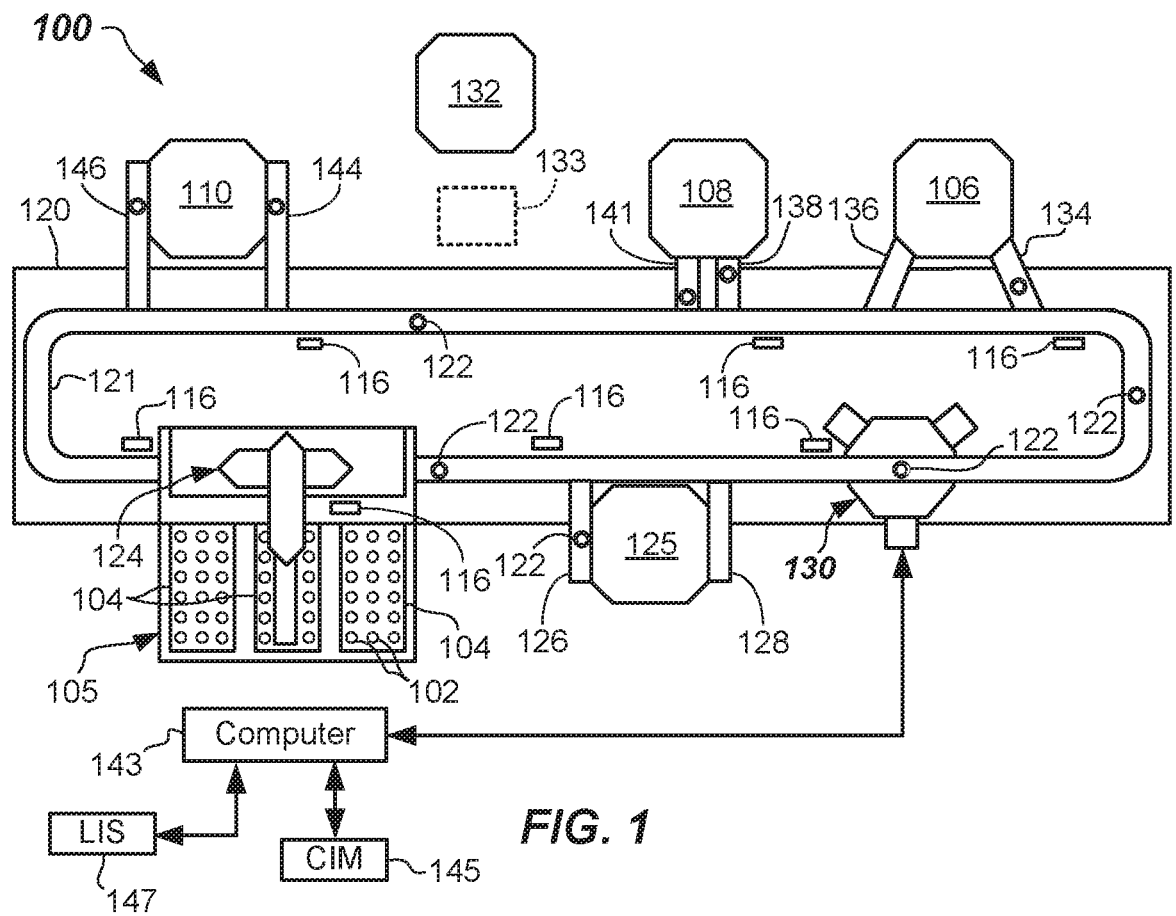
FIG. 1 illustrates a top schematic view of a specimen testing apparatus including one or more quality check modules and one or more analyzers according to one or more embodiments.

In a first broad aspect, embodiments of the present invention provide methods and apparatus adapted to image, and to characterize, a specimen and/or a specimen container. Further embodiments of the present invention provide methods and apparatus adapted to characterize a specimen contained in a specimen container and/or the specimen container. In one or more embodiments, the end result of the characterization method may be the quantification of the specimen contained in the specimen container. For example, the quantification may include characterizing the volume or depth of the serum or plasma portion, and/or the volume or depth of the settled blood portion of a fractionated specimen. These values may be used to determine if sufficient volume of the serum or plasma portion are present for the testing that has been ordered, for determining disease state of the patient (e.g., via determining a ratio between the serum or plasma portion and the settled blood portion), for more exact probe tip placement during later aspiration, and/or may be used to avoid contact or crashes of a robot gripper or probe tip with the specimen container during maneuvers.

Furthermore, according to one or more embodiments, the present invention may be used to determine characteristics of the specimen container, such as tube height and tube width, and/or cap type or cap color. The obtained dimensional characteristics may be used to properly guide the positioning of the probe (otherwise referred to as a "pipette") and/or robot gripper, during a subsequent aspiration, robot gripping moves, and may be used in the volume calculations. The cap type or cap color may be used to cross check orders.

In some embodiments, the characterizing method may be used for making a determination about the presence of an interferent, such as the presence of hemolysis (H), icterus (I), and/or lipemia (L) in the serum or plasma portion. Additionally, or optionally, the method may be used to determine if an artifact (e.g., clot, bubble, foam) is present in the serum or plasma portion.

The specimen, as described herein, may be collected in a specimen container, such as a blood collection tube and may include a settled blood portion and a serum and plasma portion after separation (e.g., fractionation using centrifugation). The settled blood portion is made up blood cells such as white blood cells (leukocytes), red blood cells (erythrocytes) and platelets (thrombocytes) which are aggregated and separated from the serum or plasma portion. It is generally found at the bottom part of the specimen container. The serum or plasma portion is the liquid component of blood that is not part of the settled blood portion. It is generally found above the settled blood portion. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components. In some specimen containers, a small gel separator (e.g. plug) may be used, which positions itself between the settled blood portion and the serum or plasma portion during fractionation. It serves as a barrier between the two portions and minimizes remixing thereof.

In accordance with one or more embodiments, the characterization method may be carried out as a screening method. For example, in one or more embodiments, the characterization method may be carried out prior to the specimen being subjected to analysis (clinical chemistry or assaying) on one or more analyzers of a specimen testing system. In one or more embodiments, the characterization of the specimen may be determined at one or more quality check modules. The one or more quality check modules may include one or more cameras arranged to provide lateral 2D images of the specimen container and specimen from one or more different lateral viewpoints. During image capture, the specimen container and specimen may be illuminated by one or more light sources. The illumination may be by one or more light panel assemblies in one or more embodiments. In particular, the illumination may be provided by back lighting with the one or more light panel assemblies in some embodiments. In others, the illumination may be by provided by front lighting or even side lighting with one or more light panel assemblies. The light sources may be spectrally-switchable light sources configured to switch between multiple different spectra (e.g., having different nominal wavelengths).

In one or more embodiments, the characterization of the specimen and/or specimen container may be carried out by using illumination with one or more light panel assemblies, coupled with high dynamic range (HDR) image processing.

However, in one aspect, to achieve even higher dynamic range, the method may undertake certain additional image capture and processing approaches. One or more embodiments herein utilize both a "dark reference image" and "spectral reference images" in combination with specimen images. In one or more embodiments, a transmittance image data set is generated based upon each of the optimally-exposed and normalized specimen image data, optimally-exposed and normalized dark reference image data, and optimally-exposed and normalized spectral reference image data. In one or more embodiments, the transmittance image data set is operated on by a multi-class classifier to classify the various components of at least the specimen and/or specimen container.

The method of image processing may also be used to determine or verify information about the specimen, such as if an artifact (e.g., clot, bubble, foam) is present, and/or whether an interferent (e.g., hemolysis, icterus, and/or lipemia—hereinafter "HIL") is present. Furthermore, the method may be used to identify characteristics of the specimen container, such as the container type (via identification of height and width thereof), the cap type, and/or the cap color.

If after characterization according to the method, the serum or plasma portion is found to contain an artifact, or H, I, or L, the specimen may be subjected to further processing. If an artifact such as a clot, bubble, or foam is found, the specimen container may be manually removed by an operator and may be sent for further processing. After such further processing, the specimen may be allowed, in some embodiments, to continue on and undergo routine analysis by the one or more analyzers. In other cases, the specimen may be discarded and redrawn. If the screening by the method finds that the specimen is normal (N), then the specimen may be directly routed to undergo routine analysis by one or more analyzers.

In one or more embodiments, a quality check module may be configured to carry out the image capture and processing according to the method. The quality check module may be provided as part of the LAS where a track transports the specimen to the one or more analyzers in a carrier, and the quality check module may be provided at any suitable location on or along the track. In a specific embodiment, the quality check module is provided on or adjacent to the track and includes back lighting with one or more light panel assemblies.

The characterization may be accomplished in one or more embodiments by using HDR image processing coupled with capture of dark reference images and spectral reference images. By capturing the dark and spectral reference images as well as the HDR images of the specimen and specimen container, images may be obtained allowing excellent discrimination between the various classes of components present in the image. The dark images may be captured with all light sources of the light panel assemblies turned off, and without the specimen or specimen container. The spectral reference images may be captured for each of the emission spectra, but without the specimen or specimen container. The specimen images may be taken at the quality check module at multiple exposure times and at multiple discreet spectra (e.g., having different nominal wavelengths). In some embodiments, the images may be obtained using multiple cameras arranged to take the images from different viewpoints. The specimen and reference images may be produced using panelized back illumination for each viewpoint, in some embodiments. Each of the specimen and reference images may be processed by a computer in order to characterize (classify and and/or quantify) the specimen, specimen container, or both.

Images at multiple exposures (e.g., exposure times) for each spectra may be obtained at the quality check modules of the specimen and specimen container. For example, 4-8 or more images at different exposure times may be obtained for each wavelength spectra. Dark reference images may be obtained, either before or after specimen imaging using HDR. Likewise, the spectral reference images may be taken before or after specimen imaging using HDR. These multiple specimen and reference images may then be further processed by a computer to generate transmittance image data sets. The transmittance image data sets may be operated upon by a multi-class classifier to yield characterization results.

Further details of the inventive imaging and characterization methods, quality check modules, and specimen testing apparatus including one or more quality check modules will be further described with reference to FIGS. 1-7 herein.

Figure 2:
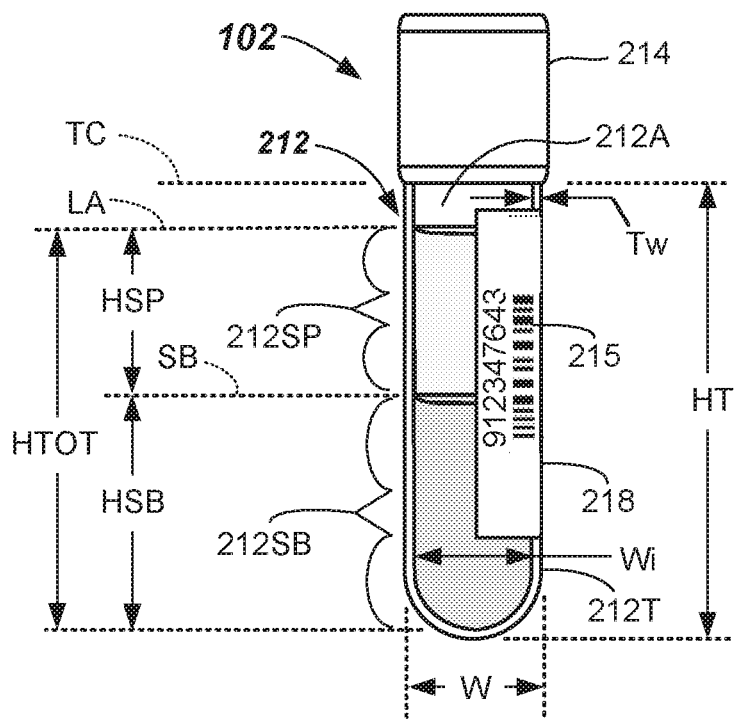
FIG. 2 illustrates a side view of a specimen container including a specimen, one or both of which may be characterized using a method according to one or more embodiments.
Figure 3:
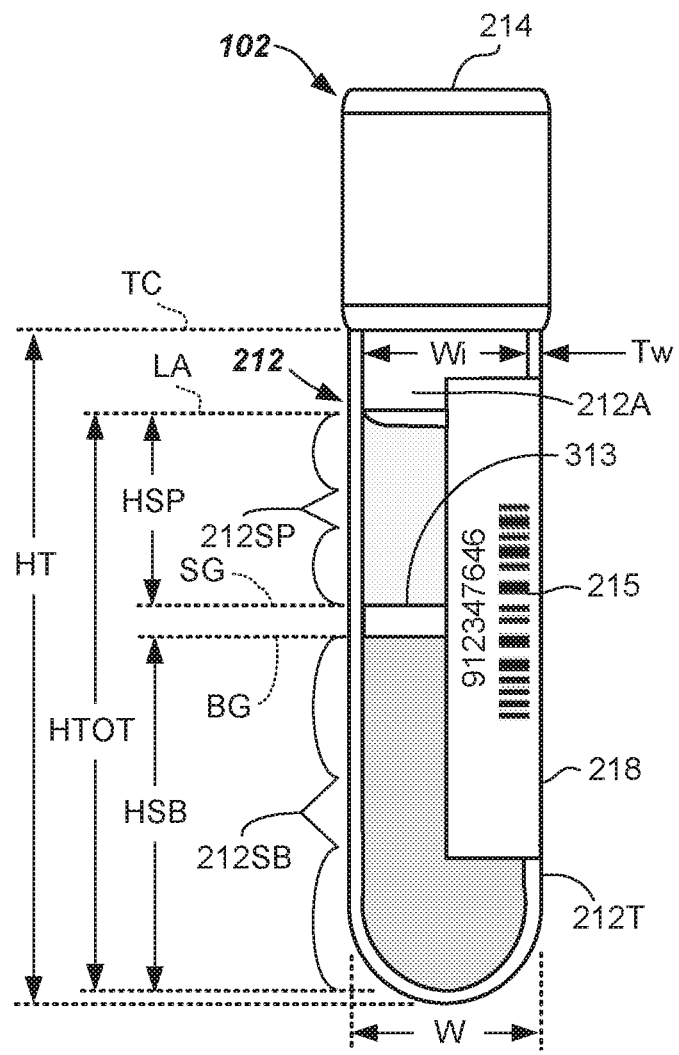
FIG. 3 illustrates a side view of a specimen container including a specimen and a gel separator, one or both of the specimen and specimen container may be characterized using a method according to one or more embodiments.

FIG. 1 shows a specimen testing apparatus 100 capable of automatically processing multiple ones of the specimen containers 102 (e.g., specimen collection tubes—see FIGS. 2 and 3). The specimen containers 102 may be contained in one or more racks 104 at a loading area 105 prior to transportation to, and analysis by, one or more analyzers (e.g., first analyzer 106, second analyzer 108, and third analyzer 110 that may be arranged about the specimen testing apparatus 100). It should be apparent that more or less numbers of analyzers can be used. The analyzers may be any combination of clinical chemistry analyzers and/or assaying instruments, or the like. The specimen containers 102 may be a transparent or translucent container, such as a blood collection tube, test tube, sample cup, cuvette, or other generally clear glass or plastic container configured to contain a specimen 212.

Typically, the specimen 212 (FIGS. 2 and 3) to be automatically imaged and processed may be provided to the specimen testing apparatus 100 in specimen containers 102, which may be capped with a cap 214 (FIGS. 2 and 3—otherwise referred to as a "stopper"). The caps 214 may have different shapes and/or colors (e.g., red, royal blue, light blue, green, grey, tan, or yellow, or combinations of colors), which may have meaning in terms of what test the specimen container 102 is used for, the type of additive contained therein, or the like. Other cap colors may be used. According to one aspect, it may be desirable to image the cap 214 in order to characterize information about the cap 214 and so that it can be used to cross check with test orders.

Each of the specimen containers 102 may be provided with identification information 215 (i.e., indicia), such as a barcode, alphabetic, numeric, alphanumeric, or combination thereof that may be machine readable at multiple locations about the specimen testing apparatus 100. The identification information 215 may indicate, or may otherwise be correlated, via a Laboratory Information System (LIS) 147, to a patient's identification as well as tests to be accomplished upon the specimen 212, or other information from the LIS system 147, for example. Such identification information 215 may be provided on a label 218 adhered to, or otherwise provided on the side of, the specimen container 102. The label 218 generally does not extend all the way around the girth of the specimen container 102, or all along a height of the specimen container 102. In some embodiments, multiple ones of the label 218 may be adhered, and may slightly overlap each other. Accordingly, although the label(s) 218 may occlude a view of some portion of the specimen 212, some portion of the specimen 212 may still be viewable from one or more viewpoints. In some embodiments, the racks 104 may have additional identification information thereon. One or more embodiments of the method and quality check modules described herein enable the characterization of the specimen 212 without any rotation of the specimen container 102.

As best shown in FIGS. 2 and 3, the specimen 212 may include a serum or plasma portion 212SP and a settled blood portion 212SB contained within the tube 212T. Air 212A may be provided above the serum and plasma portion 212SP and the line or demarcation between the air 212A and the serum and plasma portion 212SP is defined herein as the liquid-air interface (LA). The line of demarcation between the serum or plasma portion 212SP and the settled blood portion 212SB is defined herein as the serum-blood interface (SB), and is shown in FIG. 2. The interface between the air 212A and the cap 214 is referred to herein as the tube-cap interface (TC). The height of the serum or plasma portion 212SP is (HSP) and is defined as the height from the top of the serum or plasma portion 212SP to the top of the settled blood portion 212SB, i.e., from LA to SB in FIG. 2. The height of the settled blood portion 212SB is (HSB) and is defined as the height from the bottom of the settled blood portion 212SB to the top of the settled blood portion 212SB at SB in FIG. 2. HTOT in FIG. 2 is the total height of the specimen 212 and HTOT=HSP+HSB.

In cases where a gel separator 313 is used (see FIG. 3), the height of the serum or plasma portion 212SP is (HSP) and is defined as the height from the top of the serum or plasma portion 212SP at LA to the top of the gel separator 313 at SG in FIG. 3. The height of the settled blood portion 212SB is (HSB) and is defined as the height from the bottom of the settled blood portion 212SB to the bottom of the gel separator 313 at BG in FIG. 3. HTOT in FIG. 3 is the total height of the specimen 212 and is defined as HTOT=HSP+HSB+ height of the gel separator 313 as shown in FIG. 3. In each case, the wall thickness is Tw, the outer width is W, and the inner width Wi of the specimen container 102 may be determined. The height of the tube (HT) is defined herein as the height from the bottom-most part 212B of the tube 212T to the bottom of the cap 214.

In more detail, specimen testing apparatus 100 may include a base 120 (e.g., a frame or other structure) upon which a track 121 may be mounted or rest. The track 121 may be a railed track (e.g., mono-rail or multiple-rail track), a collection of conveyor belts, conveyor chains or links, moveable platforms, or any other suitable type of conveyance mechanism. Track 121 may be circular, serpentine, or any other suitable shape and may be a closed track (e.g., endless track) in some embodiments. Track 121 may, in operation, transport individual ones of the specimen containers 102 to destination locations spaced about the track 121 in carriers 122.

Carriers 122 may be passive, non-motored pucks that may be configured to carry a single specimen container 102 on the track 121, where the track 121 is moveable. Optionally, carrier 122 may be automated including an onboard drive motor, such as a linear motor and is programmed to move about the track 121 and stop at pre-programmed locations, where the track 121 is stationary. In either case, the carriers 122 may each include a holder 122H (FIGS. 4A-4B) configured to hold the specimen container 102 in a defined generally upright position. The holder 122H may include a plurality of fingers or leaf springs that secure the specimen container 102 in the carrier 122, but are laterally moveable or flexible to accommodate for different sizes of specimen containers 102 to be received therein. In some embodiments, the carrier 122 may include multiple receptacles therein. In some embodiments, carriers 122 may exit from the loading area 105 having one or more racks 104 staged thereat. In some embodiments, loading area 105 may serve a dual function of allowing offloading of the specimen containers 102 from the carriers 122 after analysis thereof is completed. Otherwise, a suitable offloading lane (not shown) may be provided elsewhere on the track 121.

A robot 124 may be provided at the loading area 105 and may be configured to grasp the specimen containers 102 with a gripper (not shown) from the one or more racks 104 and load the specimen containers 102 onto the carriers 122, such as on an input lane or other location of the track 121. Robot 124 may also be configured and operable to remove specimen containers 102 from the carriers 122 upon completion of testing. The robot 124 including one or more (e.g., at least two) robot arms or components capable of X and Z, Y and Z, X, Y, and Z, r and theta, or r, theta, and Z motion. Robot 124 may be a gantry robot, an articulated arm robot, an R-theta robot, or other suitable robot wherein the robot 124 may be equipped with robotic gripper fingers that may be sized to pick up and place the specimen containers 102.

Upon being loaded onto track 121, the specimen containers 102 carried by carriers 122 may, in some embodiments, progress to a centrifuge 125 (e.g., configured to carry out fractionation of the specimen 212). Carriers 122 carrying specimen containers 102 may be diverted to the centrifuge 125 by inflow lane 126 or a suitable local robot (not shown). After being centrifuged, the specimen containers 102 may exit on outflow lane 128, or otherwise be moved by the local robot, and continue on the track 121. In the depicted embodiment, the specimen container 102 in carrier 122 may next be transported to a quality check module 130 to be further described herein with reference to FIGS. 4A-4C.

The quality check module 130 is configured and adapted to characterize the specimen 212 contained in the specimen container 102, and may be adapted to characterize the specimen container 102 in some embodiments. Quantification of the specimen 212 may take place at the quality check module 130 and may include determination of HSP, HSB, or even HTOT, and determination of location of LA, SB or SG, and/or BG). The quality check module 130 may also be configured for determining a presence of an interferent in the serum or plasma portion 212SP of the specimen 212, such as one or more of hemolysis (H), icterus (I), and/or lipemia (L). In some embodiments, the serum or plasma portion 212SP of the specimen 212 may also be tested for the presence of an artifact (e.g., clot, bubble, or foam) at the quality check module 130. In some embodiments, quantification of the physical attributes of the specimen container 102 may take place at the quality check module 130, such as determining HT, tube outer width (W) and/or tube inner width (Wi), TC, or even cap color and/or cap type.

Once the specimen 212 is characterized, the specimen 212 may be forwarded to be analyzed in the one or more analyzers (e.g., first, second and third analyzers 106, 108, and/or 110) according to the ordered tests before returning each specimen container 102 to the loading area 105 for offloading.

In some embodiments, a remote station 132 may be provided on the specimen testing apparatus 100 even though the remote station 132 is not directly linked to the track 121. For instance, an independent robot 133 (shown dotted) may carry specimen containers 102 containing specimens 212 to the remote station 132 and return them after testing/processing/characterization. Optionally, the specimen containers 102 may be manually removed and returned. Remote station 132 may be used to test for certain constituents, such as a hemolysis level, or may be used for further processing, such as to lower a lipemia level through one or more additions, or to remove a clot, bubble or foam, for example. Other testing, processing or characterization may be accomplished on remote station 132. Furthermore, additional stations (not shown), including additional quality check modules 130, may be arranged around the track 121 at various desirable locations, such as a de-capping station, or the like.

The specimen testing apparatus 100 may include sensors 116 at one or more locations around the track 121. Sensors 116 may be used to detect a location of specimen containers 102 along the track 121 by means of reading the identification information 215 (FIG. 2) placed on the specimen container 102, or like information (not shown) provided on each carrier 122. In some embodiments, a barcode may be provided on the carrier 122. Optionally, a distinct RFID chip may be embedded in each carrier 122 and conventional barcode reader or RFID reader may be employed in the tracking operation, for example. Other means for tracking the location of the carriers 122 may be used, such as proximity sensors. All of the sensors 116 may interface with the computer 143 so that the location of each specimen container 102 may be known at all times.

Centrifuge 125 and each of the analyzers 106, 108, 110 may be generally equipped with robotic mechanisms and/or inflow lanes (e.g., inflow lanes 126, 134, 138, 144) configured to remove carriers 122 or specimen containers 102 from the track 121, and robotic mechanisms and/or outflow lanes (e.g., outflow lanes 128, 136, 141 and 146) configured to reenter carriers 122 or specimen containers onto the track 121.

Specimen testing apparatus 100 may be controlled by the computer 143, which may be a microprocessor-based central processing unit (CPU), having a suitable memory and suitable conditioning electronics, drivers, and software for operating the various components. Computer 143 may be housed as part of, or separate from, the base 120. The computer 143 may operate to control movement of the carriers 122 to and from the loading area 105, motion about the track 121, and motion to and from the centrifuge 125, motion to and from the quality check module 130. Computer 143 may also control operation of the quality check module 130. Computer 143 or a separate computer may control operation of the centrifuge 125, and motion to and from each analyzer 106, 108, 110. Usually a separate computer may control operation of each analyzer 106, 108, 110.

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the quality check module 130 may also be provided by the computer 143, but according to an inventive imaging method, as will be further described in detail herein.

Embodiments of the present invention may be implemented using a computer interface module (CIM) 145 that allows the user to readily access a variety of status and control display screens. These status and control screens may describe some or all aspects of a plurality of interrelated automated devices used for preparation and analysis of specimens 212, as well as information describing the location of any specimen 212 and status of tests to be performed on, or being performed on, the specimen 212. The CIM 145 may thus be adapted to facilitate interactions between an operator and the specimen testing apparatus 100 and may include a display screen adapted to display a menu including icons, scroll bars, boxes, and buttons.

In one aspect, screening the specimen 212 in accordance with one or more embodiments of the invention allows accurate quantification of the relative amounts of the serum or plasma portion 212SP and/or the settled blood portion 212SB, and/or a ratio there between. Further, screening may determine physical vertical locations of LA, SB or SG, and/or a bottom-most part 212B of specimen container 102 or another datum. Quantification ensures that the specimen 212 can be stopped from progressing on to the one or more analyzers 106, 108, 110, if there is insufficient amount of serum or plasma portion 212SP available to carry out the ordered tests. In this way, inaccurate test results may be avoided via avoiding the possible aspiration of air.

Advantageously, the ability to accurately quantify the physical location of LA and SB or SG may minimize not only the possibility of aspirating air, but also minimize the possibility of aspirating either settled blood portion 212SB or gel separator 313 (if the gel separator 313 is present). Thus, clogging and contamination of the specimen aspirating probe used to aspirate serum or plasma portion 212SP for the analyzers 106, 108, 110 may be avoided or minimized.

Figure 4A:
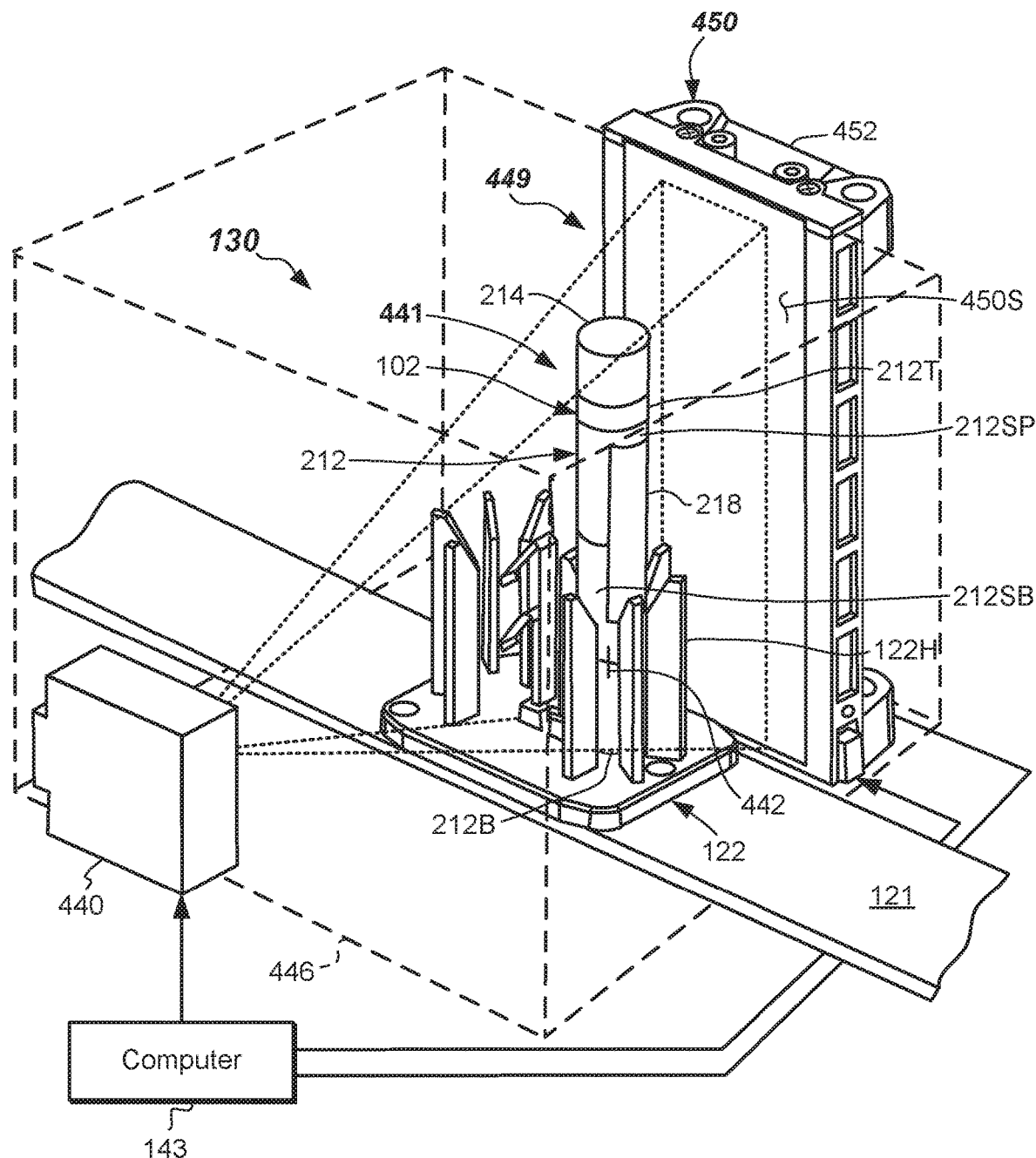
FIG. 4A illustrates an isometric view of a quality check module configured to take and analyze multiple images in order to characterize a specimen and/or specimen container according to one or more embodiments.
Figure 4B:
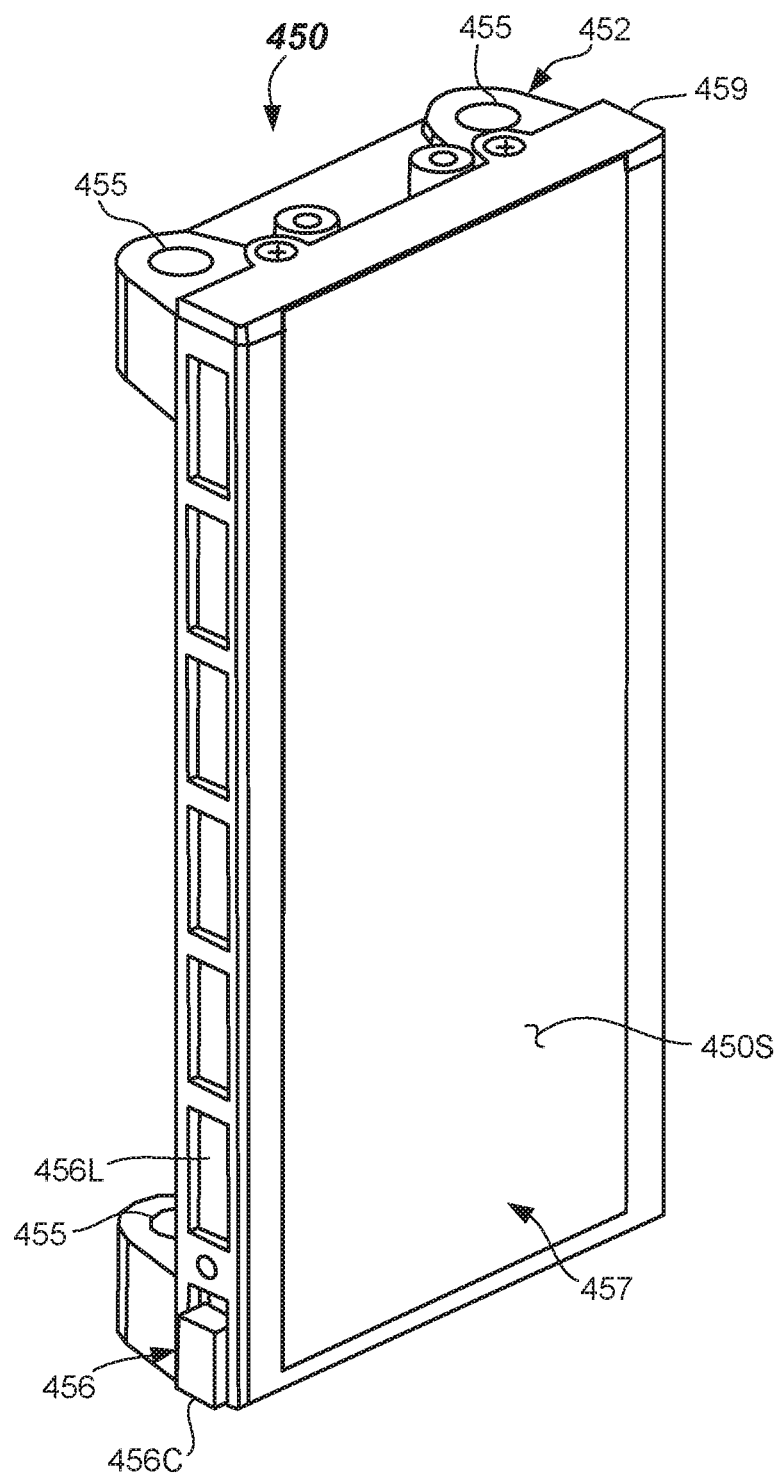
FIG. 4B illustrates an isometric view of a light panel assembly of the quality check module of FIG. 4A according to one or more embodiments.
Figure 4C:
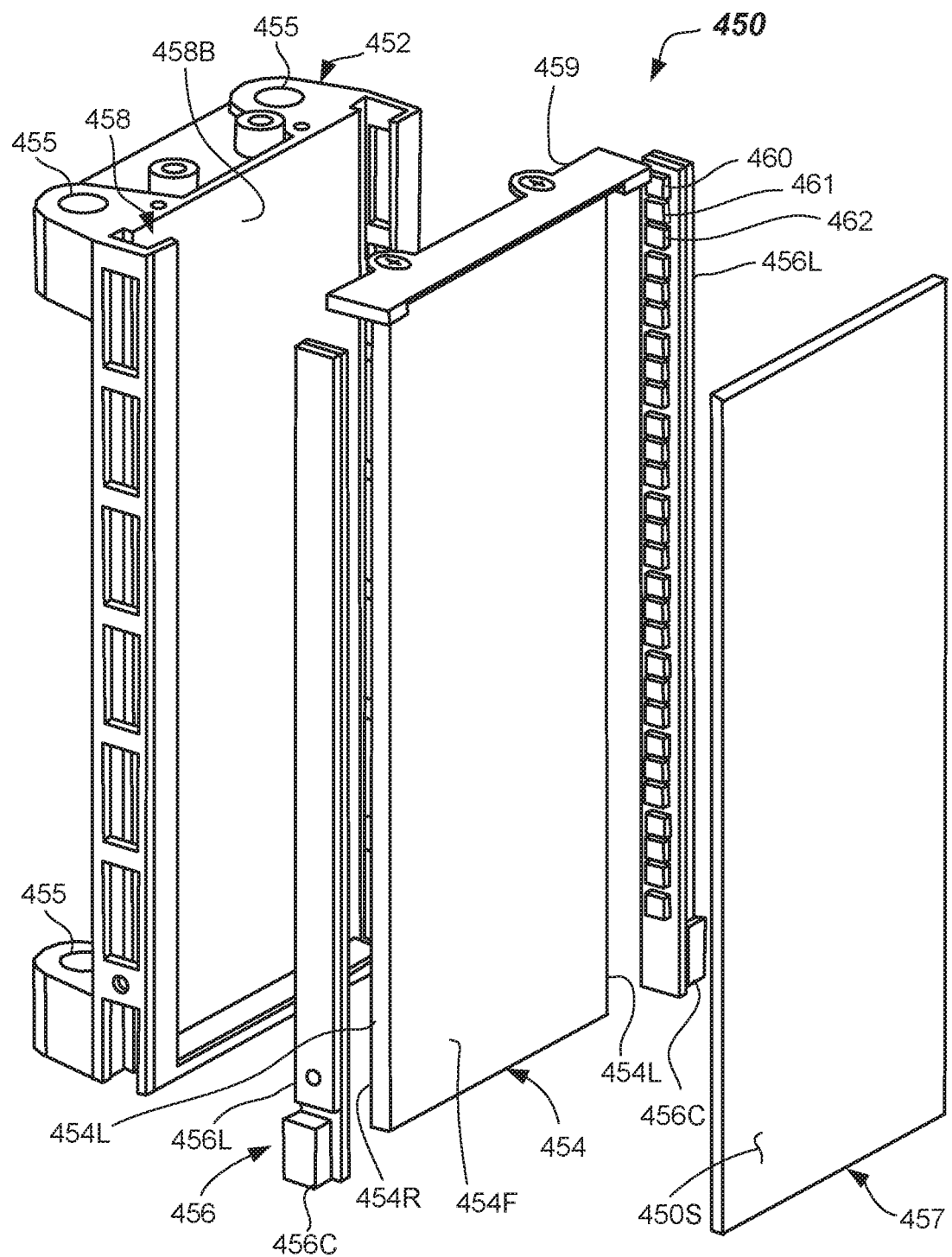
FIG. 4C illustrates an exploded isometric view of various components of the light panel assembly of FIG. 4B and the quality check module of FIG. 4A according to one or more embodiments.

With reference to FIGS. 4A-4C, a first embodiment of a quality check module 130 including a spectrally-switchable light source 449 embodied as a light panel assembly 450 including switchable light sources is shown and described.

Quality check module 130 may be configured and adapted to automatically characterize the specimen 212 (e.g., the serum or plasma portion 212SP, the settled blood portion 212SB, or both) and/or may also characterize the specimen container 102. The information obtained by the quality check module 130 may allow for precise aspiration probe and gripper positioning, determination that a sufficient amount (e.g., volume or height) of the liquid portion is available for the tests ordered, identification of H, I, or L, and/or determining the presence of an artifact (clot, bubble, or foam). Thus, using the quality check module 130 may help avoiding gripper crashes, probe clogging, air aspiration by the probe, identify HIL, and/or identify an artifact so that valuable analyzer resources are not wasted and that confidence in the test results of the analyzers (e.g., analyzers 106, 108, 110) may be improved.

Now referring to FIG. 4A, a first embodiment of a quality check module 130 is shown. Quality check module 130 may include a camera 440 that may be conventional digital camera capable of capturing a digital image (i.e., a pixelated image). Pixel as used herein may be a single pixel. In some instances, processing of the images by computer 143 may be by processing superpixels (a collection or grouping of pixels) to lower computational burden. However, camera 440 may be a charged coupled device (CCD), an array of photodetectors, one or more CMOS sensors, or the like in some embodiments. The camera 440, in this embodiment, is configured to take multiple images of the specimen container 102 and specimen 212 from a single lateral viewpoint. The camera 440 may be capable of taking a digital image having any suitable image size, such as 2560 pixels×694 pixels in some embodiments. In another embodiment, the camera 440 may have an image size of 1280 pixels×384 pixels. Other pixel densities may be used.

The camera 440 may be provided in close proximity to, and trained or focused to capture an image window at an imaging location 441 including an expected location of the specimen container 102. In some embodiments, the specimen container 102 may be placed at or stopped at the imaging location 441, such as by stopping on a track 121 or being placed at the imaging location 441 by a robot, so that it is approximately located in a center of the image window. As configured, the camera 440 can generate images that include portions of the serum or plasma portion 212SP, portions of the settled blood portion 212SB, some of the cap 214, and the bottom-most part 212B of the tube 212T, and a reference datum 442, for example. The reference datum 442 may aid in quantification of the specimen 212 and determining a vertical location of the specimen container 102 within the view window. Reference datum 442 may be a visible mark or marks (e.g., one or more crosses, rings, etc.) placed on the specimen container 102 at a known vertical location, for example, that can be viewed regardless of the rotational orientation of the specimen container 102 in the holder 122H of the carrier 122.

Referring now to FIGS. 4A-4C, the quality check module 130 may include spectrally-switchable light source 449 as an active backdrop provided by the light panel assembly 450 to provide spectrally-switchable backlighting. The light panel assembly 450 may include a frame 452, a light guide 454, and a light source 456 operational to cause light emission from a panel front surface 450S thereof. In the depicted embodiment, the light source 456 may be aligned with and emit light into the lateral edges 454L (e.g., the side edges) of the light guide 454 as best shown in FIG. 4C. The light panel assembly 450 may further include a diffuser 457, where one surface of the diffuser 457 is the panel front surface 450S of the light panel assembly 450.

The frame 452 may be made of a rigid material, such as plastic, and may include suitable fastening structures, such as bores 455 that are adapted to be mounted onto fixed mounting rods (not shown) adjacent to the imaging location. Other suitable mounting features may be included for mounting the light panel assembly 450 in a fixed orientation relative to the imaging location 441. Frame 452 may include a pocket 458 that may include an open front and top and a back surface 458B and bottom that are configured to receive and position the, light source 456, light guide 454, and the diffuser 457 (if used) therein. The light source 456, light guide 454, and diffuser 457 may be inserted into the pocket 458 from the top and secured in place with securement member 459 in some embodiments. Other means for securing the light source 456, light guide 454, and the diffuser 457 in the frame 452 may be used. The light guide 454 may be made of a suitably transparent light guide material including light diffusing capability, such as provided by a plastic sheet including internal light diffusing particles or other means of internal light diffusion. One suitable material is Acrylite LED® EndLighten, a product available from Evonik Industries AG of Essen, Germany. The light guide 454 may be made of a sheet having a width of between about 60 mm and about 150 mm, a height of between about 120 mm and 180 mm, and a thickness of between about 3 mm and about 5 mm, for example. Sheets of different dimensions may be used. In one embodiment useful for backlighting, the light guide 454 may be made of a sheet having a width of about 60 mm, a height of about 150 mm, and a thickness of about 4 mm, for example. Other suitable sizes may be used.

In the depicted embodiment of FIGS. 4A and 4B, the light guide 454 functions by guiding light emitted laterally into the lateral edges thereof by light arrays 456L (LED strip modules) of the light source 456 through the bulk material of the light guide 454 and emitting light on the front surface 454F and rear surface 454R of the light guide 454 due to light interactions with the light diffusing particles therein. In some embodiments, the rear surface 454R of the light guide 454 may include a highly-reflective material formed thereon to reflect or backscatter any light transmission passing towards the back surface 458B and direct it back into the bulk material of the light guide 454 so that it may then be emitted from the front surface 454F. Optionally, a highly-reflective material may be provided on the back surface 458B of the frame 452 or as an individual element between the back surface 458B and the light guide 454. The highly-reflective material may be provided as a mirror or a white plastic element in some embodiments. The light emitted from the front surface 454F is radiated substantially uniformly across the entire surface of the light guide 454 and illuminates the specimen container 102 and specimen 212. The highly-reflective material may be advantageous in cases where light emission power of the light panel assembly 450 is to be maximized. In cases where light emission power is not critical, a light absorbing material may be provided on the back surface 458B of the frame 452 or as an individual element between the back surface 458B and the light guide 454 to reduce backscattering of light incident on the panel front surface 450S, which may enhance signal quality for optical analysis.

The light source 456 may include light arrays 456L arranged adjacent to both lateral edges 454L of the light guide 454. The light arrays 456L may be LED strip modules including a linear array of individual lighting elements (e.g., light emitting diodes—LEDs) arranged linearly along the lateral edges 454L of the light guide 454. The light arrays 456L each may include a plurality of LEDs, such as between about 8 and 80 LEDs, for example, that may be arranged on a circuit board with a connector 456C provided to allow electrical connection to the computer 143. The light arrays 456L may be provided along the respective sides of the pocket 458 and are configured such that the emitting portion of each of the lighting elements (e.g., LEDs) are provided directly adjacent to the lateral edges 454L, and even touching the lateral edge 454L, if possible.

The light arrays 456L provide switchable multi-spectral illumination. For example, in one embodiment, the light arrays 456L may include a plurality of independently-switchable lighting elements, or lighting elements that may be switchable in groups, such as LEDs that have different light emission spectra. The switching of the lighting elements may be accomplished by software operable on the computer 143 coupled with an appropriate power source and one or more drivers. Thus, the light panel assembly 450 may be illuminated at multiple different spectra (e.g., having different nominal wavelengths) by selecting only some of the lighting elements for illumination at a time. For example, LEDs may include different colored LEDs such as red LEDs 460 (R), green LEDs 461 (G), and blue LEDs 462 (B) that emit light at different spectra. The light panel assembly 450 may emit red light at 634 nm+/−35 nm, green at 537 nm+/−35 nm, and blue at 455 nm+/−35 nm, for example. In particular, the light arrays 456L may include clusters of R, G, & B LEDs 460, 461, 462 that may be repeatedly arranged along the height of the light arrays 456L. Oslon SSL model LEDs available from Osram Opto Semiconductors GmbH of Regensburg, Germany may be used, for example. However, other suitable LEDs or light sources may be used, such as ultraviolet (UV) light sources, near infrared (NIR) light sources, or even infrared light sources, for example. Each of the same-colored LEDs or light sources may be illuminated at once. For example, each or the red LEDs 460 may be turned on simultaneously to provide red illumination from the light panel assembly 450 to illuminate the specimen container 102 containing specimen 212 during imaging thereof. Likewise, each of the green LEDs 461 may be turned on simultaneously to provide green illumination during imaging. Similarly, each of the blue LEDs 462 may be turned on simultaneously to provide blue illumination during imaging. It should be recognized that R, G, and B are only examples, and that other spectral light sources may be used. Thus, it should be apparent that the light panel assembly 450 can be configured as a switchable, multi-spectral emitter thus illuminating the specimen 212 and specimen container 102 sequentially at different spectra.

In some embodiments, some of the lighting elements may include white light sources, such that white light (e.g., wavelength range of about 400 nm to about 700 nm) may be selected for certain types of imaging. In other embodiments, UV lighting elements (wavelength range of about 10 nm to about 400 nm), NIR lighting elements (wavelength range of about 700 nm to about 1200 nm), or even IR lighting elements (wavelength range of about 1200 nm to 2500 nm) may be included. Thus, the light panel assembly 450 may include at least two switchable lighting elements having different emission spectra. In some embodiments, narrowband, switchable R, G, and B lighting elements may be provided. In some embodiments, switchable R, G, B, and broadband, white lighting elements may be provided. In yet other embodiments, narrowband, switchable R, G, B, and UV lighting elements may be provided. In yet other embodiments, narrowband, switchable R, G, B, and NIR lighting elements may be provided. In yet other embodiments, narrowband, switchable R, G, B, and broadband white, and NIR lighting elements may be provided. Any combination of two or more of switchable UV, R, G, B, or broadband white, NIR, or IR lighting elements may be provided in the light panel assembly 450. For NIR, in some embodiments a narrowband LED having a wavelength of 850 nm+/−20 nm may be used. In such embodiments, the combination of switchable lighting elements may be provided in equal amounts and generally evenly spaced along the height of the light guide 454.

The light panel assembly 450 may optionally include a diffuser 457 including diffusing properties. Diffuser 457 may be provided as a sheet of Acrylite® Satince available from EVONIK of Essen, Germany in some embodiments, for example. The 0D010 DF colorless was found to work well. The diffuser 457 may be a sheet having height and width dimensions approximately the same as the light guide 454 and a thickness of between about 2 mm and about 4 mm, for example. The diffuser 457 functions by scattering light passing through it. The diffuser 457 and the light guide 454 may be provided in spaced relationship to one another with a slight gap formed there between. The gap may be, for example, between about 1 mm and about 5 mm, and about 2.4 mm in some embodiments. The quality check module 130 may include a housing 446 (shown dotted) that may at least partially surround or cover the track 121. The housing 446 may be a box-like structure provided to eliminate outside lighting variances.

Figure 4D:
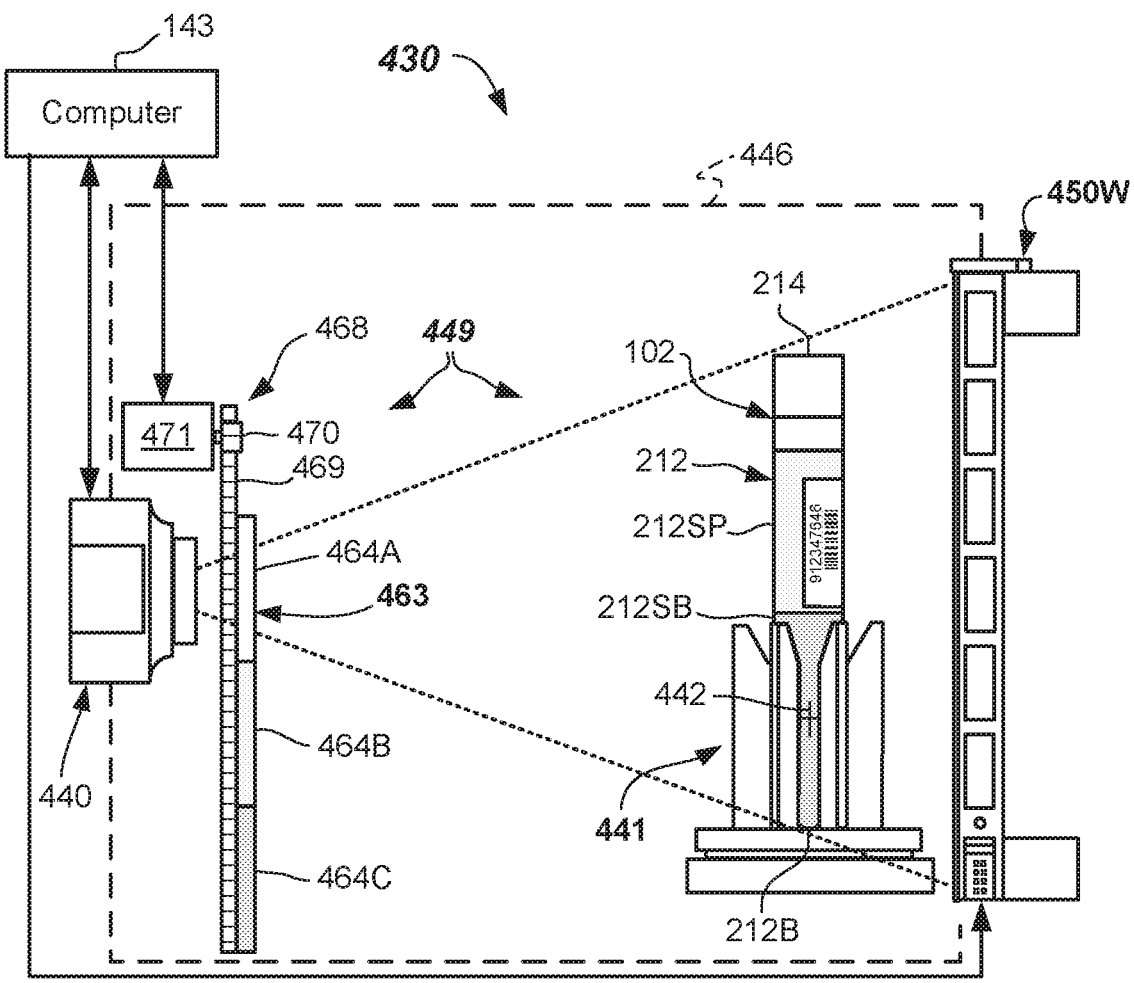
FIG. 4D illustrates a schematic side view of an alternate quality check module including a spectrally-switchable light source including a light panel assembly and a filter assembly according to one or more embodiments.

Another embodiment of quality check module 430 including a light panel assembly 450W is shown and described in FIG. 4D. Quality check module 430 may be configured and adapted to automatically characterize the specimen 212 and/or the specimen container 102 at the imaging location 441. Quality check module 430 may include a camera 440, as described above, that is configured to take images from a single lateral viewpoint.

The light panel assembly 450W may be constructed as previously indicated, however in this embodiment the LEDs or lighting elements arranged along the height of the light guide 454 may be white light LEDs or other white light elements emitting elements. The emitted white light range may be over a wavelength range of about 400 nm to about 700 nm. In this embodiment, the spectrally switchable light source 449 includes the light panel assembly 450W and a filter assembly 463 arranged in a line of sight between the camera 440 and the light panel assembly 450W. The filter assembly 463 may be a mechanically-switchable filter assembly, where two or more (three as shown) filter elements 464A, 464B, 464C may be individually moved into the view window at selected times. Each of the filter elements 464A, 464B, 464C may comprise a band-pass filter having a designed wavelength range of light that is allowed to pass through, while other wavelengths outside the range are effectively blocked. For example, the blue band-pass range for filter element 464A may be 455 nm+/−35 nm (e.g., blue), the green band-pass range for filter element 464B may be 537 nm+/−35 nm (e.g., green), and the red band-pass range for filter element 464C may be 634 nm+/−35 nm (e.g., red). Other numbers and/or transmission spectra of multiple filter elements may be used. For example, a broadband lighting element coupled with a selectable filter allowing certain selected NIR spectra to pass may be used in some embodiments. In other embodiments, combinations of white light lighting elements and NIR lighting elements may be used to emit broadband emissions (e.g., 400 nm-2500 nm), which may then be filtered with multiple selectable bandpass filters to allow only desired narrowband spectra to pass.

The filter assembly 463 may be moveable in front of the viewing window of the camera 440 by a drive assembly 468 so that each of the filter elements 464A, 464B, 464C can be individually selected to filter the light received from the light panel assembly 450W as transmitted through the specimen container 102 and specimen 212. The drive assembly 468 may include a linear rack 469 attached to and moveable with the filter assembly 463. Suitable bearings or slides may be provided (not shown) to allow the filter assembly 463 to translate smoothly. A pinion or gear 470 may be driven by a motor 471 via control signals from the computer 143 to move the linear rack 469 and the filter assembly 463 to align the various filter elements 464A, 464B, 464C with the camera 440 as selected. Other suitable techniques and mechanisms for moving filter assembly 463 or exchanging the filter elements 464A, 464B, 464C may be used, such as a linear motor, or even a rotational filter wheel.

Figure 4E:
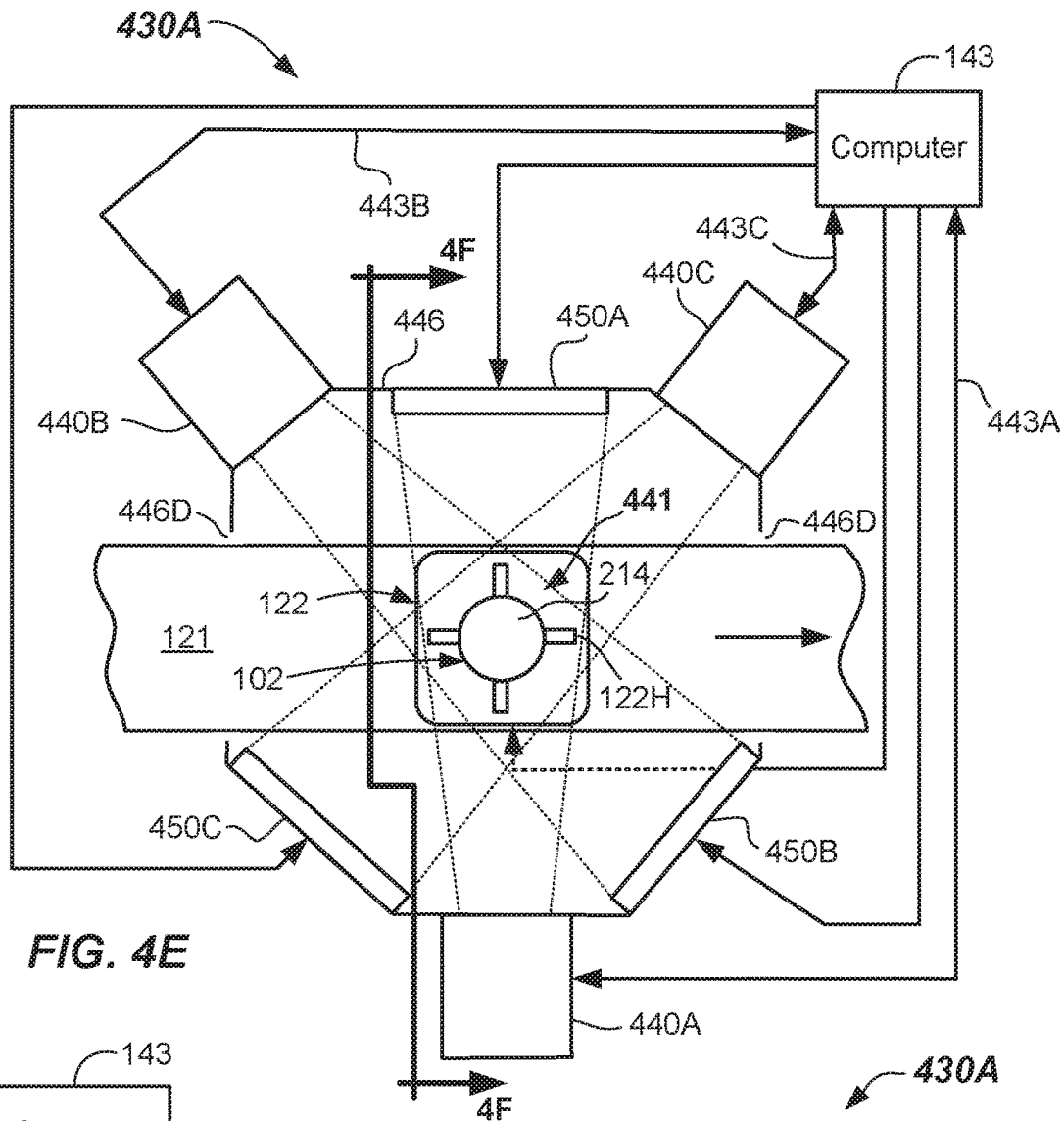
FIG. 4E illustrates a schematic top view (with ceiling removed) of a quality check module including a plurality of cameras and a plurality of light panel assemblies according to one or more embodiments.
Figure 4F:
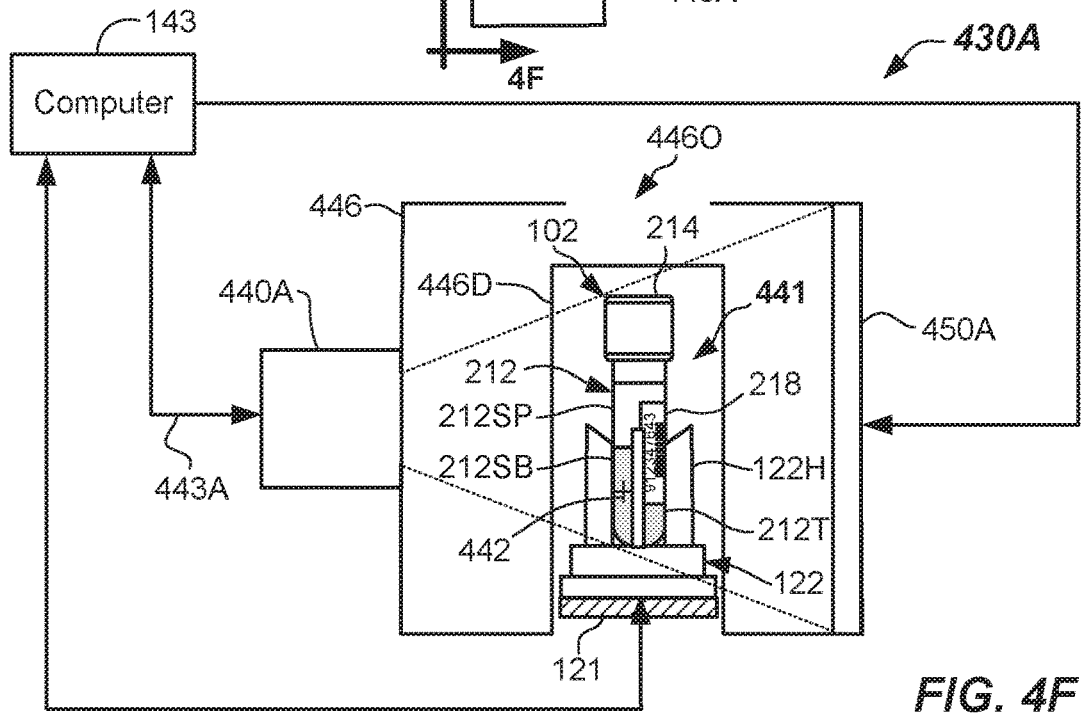
FIG. 4F illustrates a schematic side view of the quality check module of FIG. 4E taken along section line 4F-4F according to one or more embodiments.

With reference to FIGS. 4E-4F, another embodiment of a quality check module 430 including spectrally-switchable light sources is shown and described. Quality check module 430 may include multiple cameras 440A-440C and multiple light panel assemblies 450A-450C that are selectively switchable to multiple spectra as described above. Quality check module 430A may be configured and adapted to automatically characterize the specimen 212 and/or the specimen container 102.

Three cameras 440A-440C are shown in FIG. 4E, but two or more, three or more, or even four or more cameras can be used. To minimize edge distortion, three or more cameras 440A-440C may be used. Cameras 440A-440C may be the same as camera 440 discussed above. For example, three cameras 440A, 440B, 440C are illustrated in FIG. 4E and are configured to take images from multiple (e.g., three) different lateral viewpoints. Each camera 440A, 440B, 440C may be capable of taking a digital image having an image size as discussed above, for example.

Each camera 440A-440C may be configured and operable to take multiple lateral images of at least a portion of the specimen container 102 and at least a portion of the specimen 212. The images taken according to the method may include images at different wavelengths, at different exposures, and may also include reference images, such as dark reference images and spectral reference images as will be described below. For example, the cameras 440A-440C may capture a part of the label 218 or cap 214, part of the tube 212T, and the specimen 212 (see FIGS. 2-3). Eventually, from the multiple images, 2D data sets, including reference image data, may be generated by each camera and stored in memory in the computer 143. From these 2D data sets for each viewpoint, a detailed composite model of the specimen 212 in the specimen container 102 can be developed. The composite model may be a 3D model in some embodiments, and may be used to make final determinations about the specimen 212, or to confirm determinations made by using the 2D data from the images taken by the individual cameras 440A-440C.

In the embodiment shown, the plurality of cameras 440A-440C are arranged around the imaging location 441 and configured to capture lateral images from multiple viewpoints. The viewpoints may be spaced so that they are approximately equally spaced from one another, such as about 120 degrees from one another, as shown, when three cameras 440A, 440B, 440C are used. As depicted, the cameras 440A-440C may be arranged around the edges of the track 121. Other arrangements and spacing of the plurality of cameras 440A-440C may be used. In this way, the images of the specimen 212 in the specimen container 102 may be taken while the specimen container 102 is residing in the carrier 122 on the track 121. The images may overlap slightly in some embodiments.

In one or more embodiments, the carriers 122 may be stopped at a pre-determined location in the quality check module 430A, such as at a point where the optical axes of each camera 440A-440C intersect with each other at the imaging location 441. In some embodiments, a gate may be provided to stop the carriers 122, so that good quality images may be taken. Gate may be opened and closed in response to a signal provided by computer 143. In other embodiments, the carriers 122 may include a linear motor configured to stop the carrier 122 at desired locations, as programmed, and to move the carrier 122 to the next station on the track 121 subject to program signals. In embodiments including a gate at the quality check module 430A, one or more sensors (like sensors 116) may be used to determine the presence of a carrier 122 at the quality check module 430A.

The cameras 440A-440C may be provided in close proximity to and trained or focused to capture an image window, i.e., an imaging location including an expected location of the specimen container 102, wherein the specimen container 102 may be stopped so that it is approximately located in a center of the view window. As configured, the cameras 440A-440C can capture images that include portions of the serum or plasma portion 212SP, portions of the settled blood portion 212SB, some or all of the cap 214, and a bottommost part 212B of the tube 212T or a reference datum 442. The reference datum 442 may aid in quantification of the specimen 212. Reference may be made to TC, the bottommost part 212B of the specimen container 102, or to the reference datum (e.g., a visible mark placed on the specimen container 102 in a known location), for example.

In operation, each image being taken may be triggered and captured responsive to a triggering signal send by computer 143 and provided in communication lines 443A-443C when the computer 143 receives a signal or otherwise determines that the carrier 122 is located at the desired location in the quality check module 430A. Each of the captured images may be processed according to one or more embodiments of the method provided herein. In particular, HDR image processing may be used to capture and process the images in order to characterize the specimen 212 and specimen container 102 with a high level of detail and informational content. The method may include capturing reference images either prior to or after screening.

In more detail, multiple images may be captured of the specimen 212 at the quality check module 430A at multiple different exposures times, at multiple different spectra (or one or more wavelength ranges), and from different viewpoints. For example, each camera 440A-440C may take 4-8 or more images at different exposures times and at the multiple wavelengths. Other numbers of exposure time images may be taken. Reference images, including a dark reference image for each viewpoint and spectral reference images for each viewpoint may be taken by cameras 440A-440C according to an embodiment of the imaging method.

In one embodiment, the multiple spectral images may be accomplished as back illuminated by using the light panel assemblies 450A-450C. The spectrally-switchable light sources 449 embodied as the light panel assemblies 450A-450C may back light the specimen container 102 as shown in FIGS. 4E-4F and may include switchable light sources, as described above. Optionally, in another embodiment, light panel assemblies 450A-450C may back light the specimen container 102 with white light between 400 nm and 700 nm or even broadband light (e.g., between 400 nm and 2000 nm) and selectable band-pass filters may be used to capture images at multiple selected spectra as discussed above, for example. Thus, in each embodiment, the spectrally-switchable light source provides multiple emission spectra that are switchable between spectra (e.g., colors R, G, B, and others). The capture and use of the multiple images illuminated at different selectable spectra increases the information content for analysis and may emphasize certain characteristic absorption spectra.

For example, to capture images illuminated at a first spectrum, the red LEDs 460 of each of the light panel assemblies 450A-450C (nominal wavelength of about 634 nm with a spectral variation of about +/−35 nm) may first be used to illuminate the specimen 212 from three lateral locations. The red illumination by the light panel assemblies 450A-450C may be provided as the multiple images (e.g., 4-8 or more images) at different exposures are captured by each camera 440A-440C. In some embodiments, the exposure times may be varied between about 0.1 ms and 256 ms. Other exposure times may be used. Each of the respective exposure time images being illuminated with red light for each camera 440A-440C may be taken simultaneously and stored in memory in computer 143.

Once the red illuminated images are captured, the red LEDs 460 may be turned off and another light spectrum, for example, green LEDs 461 may be turned on (nominal wavelength of about 537 nm with a spectral variation of about +/−35 nm), and multiple images (e.g., 4-8 or more images) at different exposures may be captured at that nominal wavelength by each camera 440A-440C. This may be repeated with blue LEDs 462 (nominal wavelength of about 455 nm with a spectral variation of about +/−35 nm) for each camera 440A-440C. In some embodiments, light panel assemblies 450W may be accomplished via use of white light LEDs coupled with the use of exchangeable filter assemblies 463 as described with reference to FIG. 4D. The light panel assemblies 450A-450C or 450W may provide homogeneous light emission over the entire field of view of the cameras 440A-440C.

In yet other embodiments, the light panel assemblies 450A-450C may include a light source matrix of individual light sources (e.g., R, G, and B LEDs) provided behind the diffuser 457, each of which may be individually switchable or switchable in color groups. Thus, different colored lighting (e.g., R, G, B and/or a multitude of other colors) can be selectively turned on and off, for example, to illuminate the imaging location 441 at multiple selectable spectra of light.

In yet other embodiments, light panel assemblies 450A-450C may back light the specimen container 102 with broadband light (e.g. between 400 nm and 2000 nm) and one or more spectrally-selective cameras may be used as the cameras 440A-440C. The spectrally-selective camera (also multispectral or hyperspectral camera) is suited to generate spectrally-selective images, i.e. multiple images at respective discrete spectra (e.g., R, G, B and/or a multitude of other colors). The spectrally-selective camera may comprise a spectral filter pattern similar to the Bayer pattern spectral filter of a conventional color camera, but with potentially different wavelengths relevant for analysis of the serum or plasma portion 212SP. The filter pattern results in spectral selectivity on the pixel level, e.g. one pixel may be suited to receive light at one nominal wavelength and another pixel may be suited to receive light at a different nominal wavelength. Therefore, using one preferably broadband illumination spectrum, multiple images acquired at multiple respective spectra can be generated. Other techniques to achieve spectral selectivity in a camera can be used. The one or more spectrally-selective cameras may be used in combination with one or more spectrally-switchable light sources to provide more imaging options while using less light sources.

In the various embodiments, the quality check module 130, 430, 430A, 430B may include a housing 446 that may at least partially surround or cover the track 121, and the specimen container 102 may be located inside the housing 446 during the specimen image taking and reference image taking phases. Housing 446 may include one or more doors 446D to allow the carriers 122 to enter into and/or exit from the housing 446. In some embodiments, the ceiling may include an opening 446O to allow a specimen container 102 to be loaded into the carrier 122 by a robot including a gripper adapted to grasp the specimen container 102.

Figure 4G:
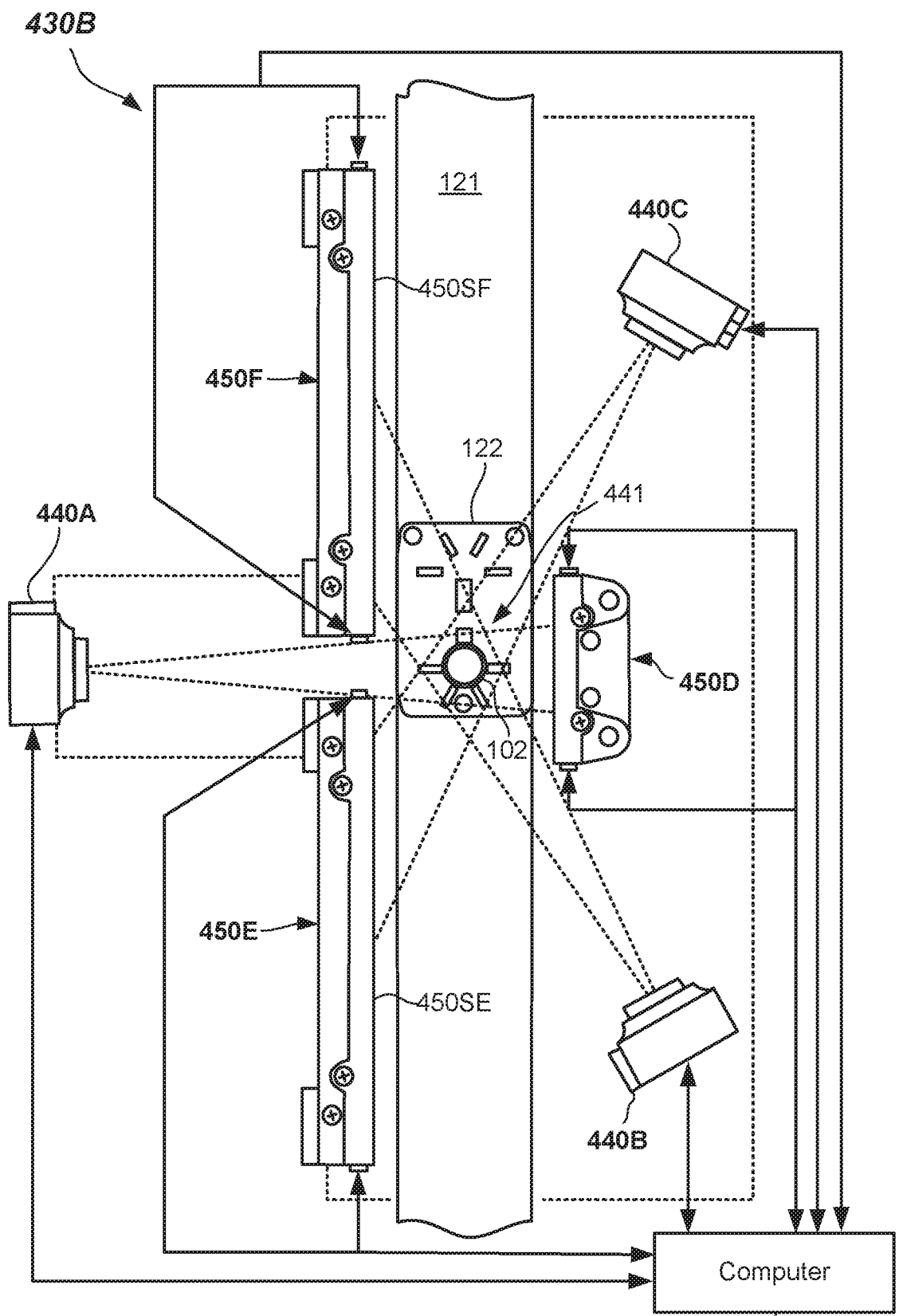
FIG. 4G illustrates a schematic top view of an alternate quality check module including a plurality of light panel assemblies according to one or more embodiments.

In another embodiment, as best shown in FIG. 4G, the specimen container 102 may be illuminated in the quality check module 430B, such as by including light panel assemblies 450D, 450E, and 450F arranged across from the respective cameras 440A-440C. In this embodiment, the cameras 440A-440C may be digital monochrome cameras and the spectrally switchable light source 449 including light panel assemblies 450D, 450E, and 450F may emit selectively switchable spectra, such as R, G, and B spectra at approximately 634 nm+/−35 nm, 537 nm+/−35 nm, and 455 nm+/−35 nm, respectively.

In this alternate embodiment, it is possible to achieve multiple illumination modes that may be desirable for different types of characterizations by focusing on transmissive imaging, absorbance imaging, and/or reflective imaging. For example, with the configuration of FIG. 4G, the imaging location 441 may include frontlit and backlit illumination or various combinations thereof using the light panel assemblies 450D, 450E, and 450F. In the depicted embodiment, the light panel assemblies 450E, 450F are arranged such that the frontal surfaces 450SE, 450SF are substantially parallel with one another and may be substantially parallel with the direction of the track 121. For example, illumination of light panel assemblies 450E and 450F, with light panel assembly 450D not being illuminated, may be used to front illuminate the specimen 212 and specimen container 102 for the camera 440A. In some embodiments, the camera 440A may be a monochrome camera and the front lighting may occur during imaging at multiple spectra by switching the illumination by the light panel assemblies 450E and 450F between multiple discreet spectra, such as from red (R) to green (G) to blue (B), and/or to other spectra, in any order.

In an optional embodiment, the light panel assemblies 450E and 450F may front light the imaging location 441 with white light and the camera 440A may be a color camera. Multiple images at different exposures may then be taken by camera 440A. Each image taken by camera 440A may be stored in memory of the computer 143 and then separated into color components at multiple wavelengths to provide the captured specimen images at multiple spectra. For example, computer 143 may separate the images into at least three captured spectra between about 400 nm and about 700 nm. For example, RGB components having nominal wavelengths at about 455 nm, 537 nm, and 634 nm, respectively, may be separated out of the image data stored by the computer 143 to generate the multi-spectral, multi-exposure captured images from the frontlit viewpoint. Images may be taken, as before, via signals from the computer 143 in lines 443A while being illuminated by the light panel assemblies 450E and 450F. Such frontlit imaging may be suitable for determining color of the cap 214, determining the location of the label 218, reading a barcode, or even for segmentation, for example.

In another embodiment all three cameras and all three light panel assemblies 450D-450F may be operable and the light panel assemblies 450D-450F may act as back lighting sources for the cameras 440A-440C for transmissive imaging such as for an absorbance measurement, such as for HIL detection, artifact detection, or even segmentation, for example. Other uses may be possible.

In yet another configuration, the side lighting mode may be provided by the quality check module 430B. The side lighting may be accomplished, for example, by illuminating with light panel assembly 450D and imaging with camera 440B or 440C or both. The illumination mode may be used for turbidity analysis or for determining refractive index, for example. Other uses may be possible.

For each of the above setups, all of these multiple images taken at multiple exposure times for each respective wavelength (e.g., R, G, and B, and/or white light, and/or other spectra) may be obtained in rapid succession, such that the entire collection of images for the specimen 212 from multiple viewpoints may be obtained in less than about 2 s, for example. Other lengths of time may be used.

For example, using the quality check module 130 of FIG. 4A, 4 different exposure images for each spectrum using the camera 440 and back lighting with spectrally-switchable light source 449 comprising light panel assembly 450 will result in 4 images×3 colors×3 cameras=36 images. In another example using the quality check module 430B of FIG. 4G, 4 different exposure images using the camera 440A and front lighting with white light sources of the light panel assemblies 450E, 450F will result in 4 images×3 cameras=12 images. However, RGB images may then be captured by the computer 143 by separating the white light images taken into the individual RGB components thereof. Thus, after separation, 36 images are also captured. The 2D image data may be stored in memory of the computer 143 along with the reference images and subsequently further processed thereby. Additional reference images may be taken, as will be described below.

According to a method of processing the image data, the processing of the image data may first involve, for example, selection of optimally-exposed pixels from the image data of the multiple captured images at the different exposure times and at each wavelength, and for each camera 440A-440C if multiple cameras are used, so as to generate optimally-exposed image data for each spectrum (e.g., RGB colored images) of illumination and for each camera 440A-440C. This is referred to as "image consolidation" herein. For each corresponding pixel, for each of the different wavelength illuminated images from each viewpoint, pixels exhibiting optimal image intensity may be selected. Optimal image intensity may be pixels that fall within a predetermined range (e.g., between 180-254 on a scale of 0-255), for example. However, even lower intensities may be considered optimal in some embodiments, such as between 16-254 on a scale of 0-255. If more than one pixel in the corresponding locations of two different wavelength illuminated images (from one camera) is determined to be optimally exposed, the higher intensity of the two may be selected. The result is a plurality of consolidated 2D specimen image data sets (e.g., for each of R, G, and B) for each viewpoint where all of the pixels of the images are optimally exposed (e.g., one specimen image data set per spectrum (e.g., R, G, and B) and viewpoint.

The respective consolidated intensity values $S(x,y,e_{opt})$ of the pixels in each of the specimen image data sets may be normalized according to the equation:

$$Sn(x,y)=S(x,y,e_{opt})/e_{opt}$$

Thus, normalized 2D specimen image data sets are provided after normalization for each viewpoint.

Figure 5A:
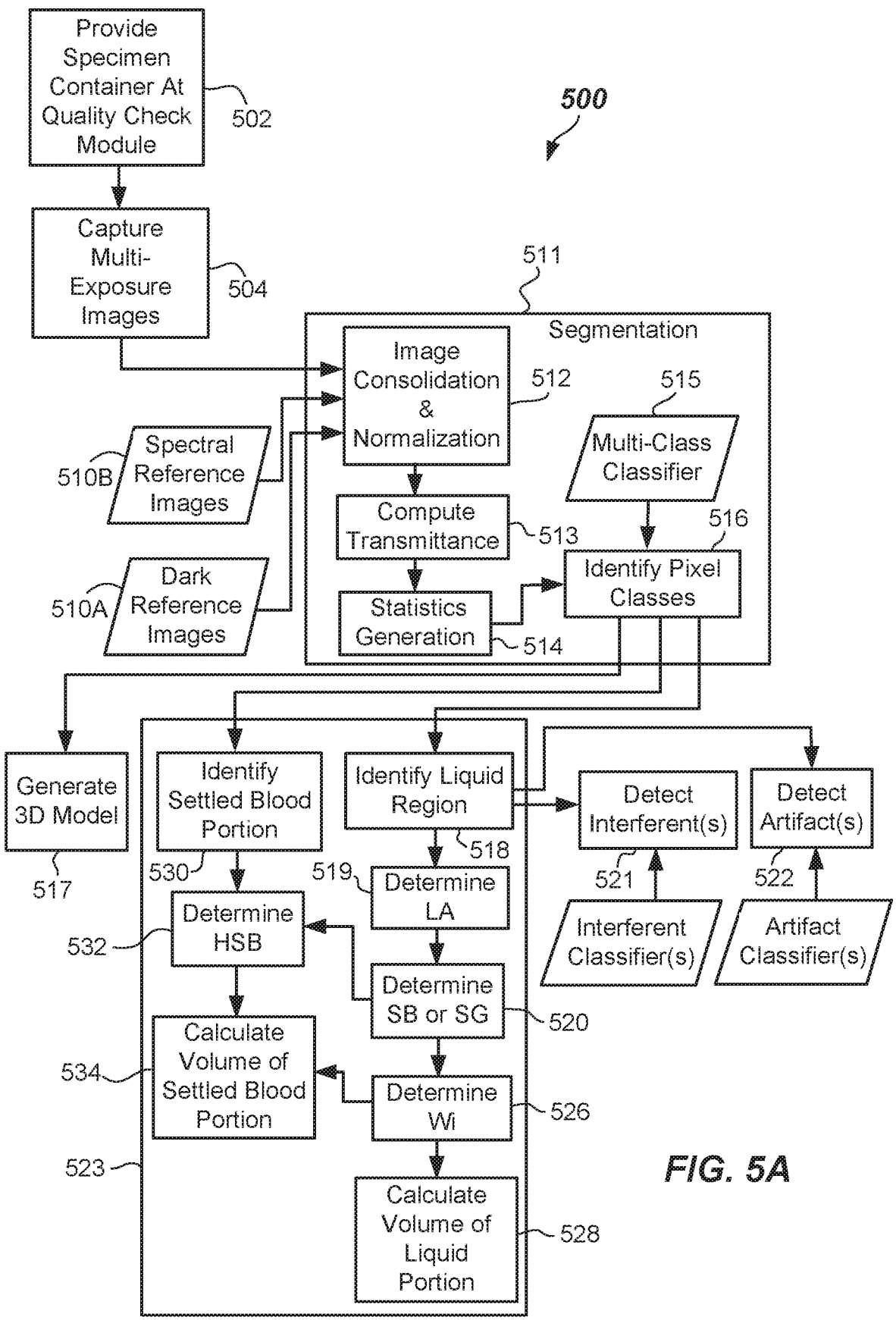
FIG. 5A illustrates a block diagram of components of a quality check module configured to characterize a specimen according to one or more embodiments.
Figure 5B:
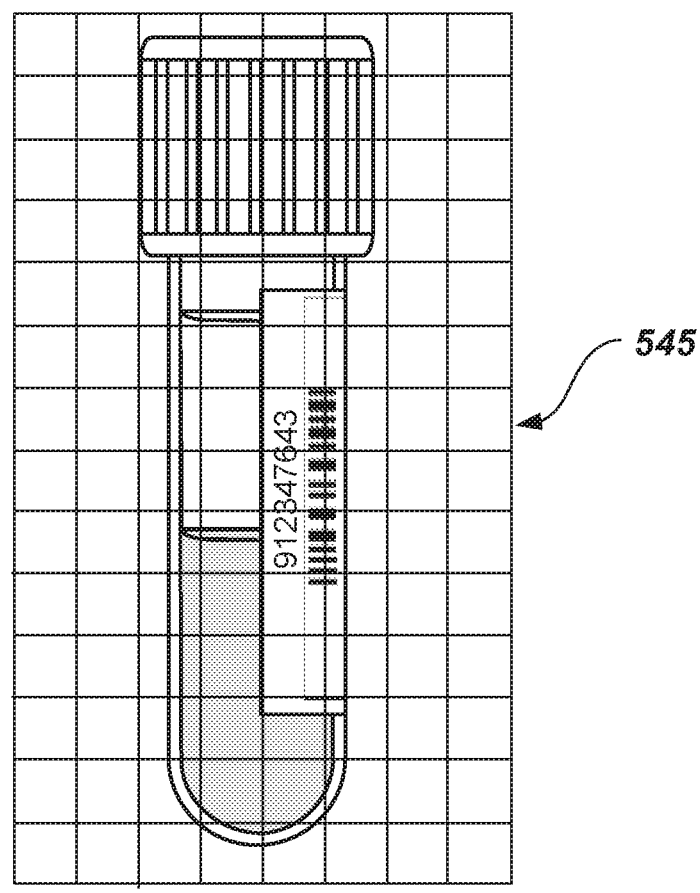
FIG. 5B illustrates a diagram of a specimen container image projected onto a virtual 3D voxel grid according to one or more embodiments.

As part of the characterization method, the quality check modules 130, 430, 430A, 430B may commence with capturing multiple reference images (e.g., in 510A, 510B of FIG. 5A). The reference images may be taken of the backstop at the imaging location 441, but without a carrier 122 or specimen container 102 at the imaging location 441. In this way, the effect of any ambient light present in the quality check modules 130, 430, 430A, 430B can be minimized and signal quality may be enhanced.

In one aspect, one or more dark reference images may be taken for each viewpoint at multiple exposures (e.g., multiple different exposure times). The dark reference images may be captured for each viewpoint with all of the light sources turned off, and without a specimen container 102 or carrier 122 at the imaging location 441. Optimally-exposed pixels for each of the multiple exposure time images may be selected to provide a dark reference image data set that is consolidated. The selected optimally-exposed pixels of the dark reference image may then be normalized. Normalizing may be provided by dividing the optimally-exposed pixel intensity of a pixel of the dark reference image by the exposure time for that pixel to generate $D_n(x, y)$, where:

$$D_n(x,y)=D(x,y,e_{opt})/e_{opt}$$

In some embodiments, spectral reference images for each exposure and illumination condition (R, G, B, or white light) may also be captured by the quality check module 130, 430, 430, 430A (e.g., in 510B of FIG. 5A). The spectral reference images may be images for each viewpoint without a specimen container 102 or carrier 122 located at the imaging location 441. The spectral reference image data may be consolidated into one image data set per spectrum by selecting optimally-exposed pixels per spectrum for all corresponding pixel locations to arrive at $R_n$ (x, y). Normalizing may be provided by dividing the optimally-exposed pixel intensity of the spectral reference data set by the optimal exposure for each pixel as follows:

$$R_n(x,y)=R(x,y,e_{opt})/e_{opt}$$

The reference dark and spectral images may be taken before carrying out the specimen imaging according to the method. For example, they may be timed to be taken as a next carrier 122 to be screened at the quality check module 130, 430, 430A, 430B exits the centrifuge 125. Optionally, but less desired, the reference images may be taken after specimen imaging at the quality check module 130, 430, 430A, 430B.

The normalized specimen data $S_n$ (x, y) and the normalized spectral reference data $R_n$ (x, y) and the normalized dark reference data $D_n$ (x, y) may be used to determine the spectral transmittance image data T(x, y) according to the relationship below:

$$T(x,y)=\{(S_n(x,y)-D_n(x,y))\}/\{R_n(x,y)-D_n(x,y)\}$$

The transmittance 2D data set for each viewpoint may allow for accommodating and eliminating the effect of spectral drift of the lighting source, and also accommodates for light element intensity differences over different areas of the light source.

For each transmittance 2D data set for each viewpoint, a segmentation process continues to identify a class for each pixel for each viewpoint. For example, the pixels may be classified as serum or plasma portion 212SP, settled blood portion 212SB, gel separator 313 (if present), air 212A, tube 212T, or label 218. Cap 214 may also be classified. In some embodiments, background and carrier 122 may be classified. Classification may be based upon a multi-class classifier (e.g., multi-class classifier 515 of FIG. 5A) generated from multiple training sets.

To carry out the pixel-level classification, statistical data may be computed for each of the optimally-exposed pixels of the 2D transmissive data set at the different wavelengths (e.g., R, G, B) and for each viewpoint to generate 2D statistical data sets (e.g., in 514). The 2D statistical data sets may include mean values and covariance. Other statistics may be generated. The statistical data may include attributes up to second order which may include mean values, variance, and correlation values. In particular, the covariance matrix is computed over multidimensional data representing discriminative patterns.

Once generated, each 2D statistical data set is presented to, and operated on, by the multi-class classifier 515, which may classify the pixels in the image data sets as belonging to one of a plurality of class labels discussed above. The result of the segmentation in 511 is one or more consolidated 2D data sets, one data set for each viewpoint where all the pixels therein are now classified.

The multi-class classifier 515 may be any suitable type of supervised classification model that is linear or non-linear. For example, the multi-class classifier 515 may be a support vector machine (SVM). Optionally, the multi-class classifier 515 may be a boosting classifier such as an adaptive boosting classifier (e.g., AdaBoost, LogitBoost, or the like), any artificial neural network, a tree-based classifier (e.g., decision tree, random decision forests), and logistic regression as a classifier, or the like. An SVM may be particularly effective for classification between liquids and non-liquids, such as found in the analysis of the specimen 212 and specimen container 102. A SVM is a supervised learning model with associated learning algorithms that analyzes data and recognizes patterns. SVMs are used for classification and regression analysis.

Multiple sets of training examples are used to train the multi-class classifier 515, and then the 2D image data sets are operated on by the multi-class classifier 515 and each pixel is classified as a result. The multi-class classifier 515 may be trained by graphically outlining various regions in a multitude of examples of specimen containers 102 having various specimen conditions (e.g., including H, I, or L or an artifact), occlusion by label 218, levels of serum or plasma portion 212SP and settled blood portion 212SB, containing gel separator 313 or not, and including tube 212T and carrier 122, and the like. As many as 500 or more images may be used for training the multi-class classifier 515. Each training image may be outlined manually to identify and teach the multi-class classifier 515 the areas that belong to each class.

A training algorithm may be used to build the multi-class classifier 515 that assigns pixels of any new specimen into one of the classes. The SVM model represents examples as points in space that are mapped so that the examples of the separate classes are divided by a clear gap that is as wide as possible. New pixels from the image data sets may be mapped into that same space and predicted to belong to a particular class based on where they fall on the map. In some embodiments, SVMs can efficiently perform a non-linear classification using what is called a kernel trick (e.g., kernel-based SVM classifier), implicitly mapping their inputs into high-dimensional feature spaces. SVM, tree-based classifiers, and boosting are particularly preferred. Other types of multi-class classifiers may be used.

A flow chart of the imaging and characterization method according to one or more embodiments is shown in FIG. 5A. According to the method 500, the specimen container 102 including specimen 212, carried by carrier 122, is provided at the quality check module (e.g., quality check module 130, 430, 430A, 430B) in 502. Multiple images are captured at 504; the multiple images being multi-spectral images taken at multiple different exposures and at multiple different spectra, and at one or more viewpoints, as described above. For quantification, the front lighted setup of quality check module 430B may be used. For detecting interferent in 521 or detecting artifact in 522, the backlit setup in FIGS. 4A, 4D, 4E and 4F, or 4G may be used. In each case, the multiple images taken in 504 may be stored in memory of the computer 143. From these images, the background variations may optionally be removed in a background removal phase. Background removal may be accomplished by subtracting reference images (e.g., dark reference images) that may be previously taken in 510A.

After image capture in 504, segmentation may be undertaken in 511. The segmentation in 511 may include an image consolidation and normalization in 512. During image consolidation in 512, the various exposure time images at each wavelength spectra (R, G, and B) and for each viewpoint are reviewed pixel-by-pixel to determine those pixels that have been optimally exposed, as compared to a standard (described above). For each corresponding pixel location of the exposure time images for each viewpoint, the best of any optimally-exposed pixel is selected for each spectra and viewpoint and included in an optimally-exposed 2D image data set. Normalization may also occur in 512. Thus, following image consolidation and normalization in 512, there is produced one optimally-exposed 2D image data set for each spectra (R, G, and B) and for each viewpoint (e.g., for each camera 440, or cameras 440A-440C). The use of HDR processing may function to enrich the details of the images, especially with respect to reflection and absorption and to enhance characterization and quantification accuracy. Normalization is described fully above.

Following image consolidation in 512 or possibly concurrent therewith, statistics generation may be undertaken in 514, where statistical attributes up to second order are generated for each pixel, such as mean and covariance. These 2D statistical data sets are then operated on by the multi-class classifier 515 to identify the pixel classes present in 516. For each superpixel location a statistical description is extracted within a small patch (e.g. a superpixel of 11×11 pixels). Each patch provides a descriptor which is considered in the evaluation process. Typically, the classifiers operate on feature descriptors and use output class labels. The final class for each superpixel may be determined my maximizing confidence values for each superpixel. The calculated statistical values encode specific properties of classes and are thus used for discrimination between different classes.

From this segmentation of 511, a consolidated 2D image data set is generated for each of the viewpoints, wherein each pixel in the consolidated image data set is given a classification as one of a plurality of class types in 516 described above. From this segmentation in 511, a 3D model may be generated and constructed in 517 from the consolidated 2D image data sets. The 3D model may be used to ensure a result that is consistent among the various viewpoints (if multiple cameras 440A-440C are used) or the 3D model may be used directly for displaying the various classifications and quantifications.

According to the method, the liquid region (e.g., the serum or plasma portion 212SP) may be identified in 518. This may involve grouping all the pixels from class—serum or plasma portion 212SP, and then determining a location of the upper interface between liquid (serum or plasma portion 212SP) and air 212A (i.e., LA) in 519 for the consolidated 2D image data sets. This may be done for each viewpoint. A numerical value for LA may be calculated for each of the consolidated 2D image data sets by averaging the locations of the uppermost pixels classified as serum or plasma portion 212SP for each viewpoint. Any substantial outliers may be rejected and not used in the average. Previously performed pixel space to machine space (e.g., in mm) calibration may be accomplished by any known machine space to image space calibration technique and may be used to convert pixel space to machine space useable by the robot 124 for gripping or by other robots used for aspiration. These numerical values for LA for each viewpoint (if more than one viewpoint) can be aggregated to identify a final value of LA that may be used in the 3D model. The aggregation may be by any suitable method to fuse the respective results of the viewpoints, such as by averaging the numerical values for LA for each of the viewpoints, for example. If one value is substantially below the other two, it may be discarded as an outlier.

Depending on whether a gel separator 313 is present (e.g., used), the quantification method then may determine the location of SB or SG (if gel separator is present) in 520 for each viewpoint. A numerical value for SB or SG for each viewpoint may be calculated in 520 by averaging or aggregating the locations of the lowermost pixels classified as serum or plasma portion 212SP in 516. A single value for SB or SG may be determined for the 3D model by averaging the SB or SG values for the viewpoints. From the locations of LA and SB or SG, the height of the serum or plasma portion HSP (FIGS. 2 and 3) may be determined via subtraction of the averages for LA and SB or SG.

Quantifying the liquid region (e.g., the serum or plasma portion 212SP) may further include determining an inner width (Wi) of the specimen container 102 in 526. In some embodiments, the outer width (W) may first be determined in 526 by identifying the pixels that are classified as tube 212T for each consolidated 2D image data set and subtracting the locations of corresponding ones of the pixels that are located on the lateral outside edges of the tube 212T (for example, as measured between LA and SB or SG), and then averaging the subtracted values for each viewpoint. A final value of W may be determined by averaging the W values from the viewpoints. Substantial outliers may be ignored. Wi may be determined from W by subtracting twice the wall thickness Tw. Tw may be an average wall thickness value that has been estimated for all specimen containers 102 and stored in memory or Wi may be obtained from a lookup table based upon the tube type determined based upon the outer width W and the height HT value for the specimen container 102.

From HSP, and Wi, the volume of the liquid region (e.g., the serum or plasma portion 212SP) may be determined using Eqn. 1 below in 528 for the 3D model.

$$VSP = HSP \times Pi/4 Wi^2 \qquad \text{Eqn. 1}$$

To quantify the settled blood portion 212SB, a similar method may be followed. The pixels corresponding to the class of settled blood portion 212SB may first be identified in 530. Depending on whether a gel separator 313 is present, height of the settled blood portion HSB for each viewpoint may be determined in 532 by locating the lowermost pixel of the settled blood portion 212SB in each consolidated 2D image data set and then subtracting either SB or BG. SB may be determined in 520. In the gel separator 313 is present, then BG may be determined for each viewpoint by averaging the lowermost vertical locations of pixels classified as gel separator 313. The lowermost pixel of the settled blood portion 212SB may be determined by finding the lowestmost vertical dimension of the specimen container 102 and then subtracting the wall thickness Tw for each viewpoint. Wi may be determined in 526. A final value of HSB may be determined by averaging the respective HSB values of each of the viewpoints. From the final value of HSB and Wi, the volume of the settled blood portion 212SB may be determined in 534 using Eqn. 2 below for the 3D model.

$$VSB = (HSB \times Pi/4 Wi^2) - \tfrac{1}{2} Wi^2 + (Pi/24) Wi^3 \qquad \text{Eqn. 2}$$

Optionally, the various pixel classes of the consolidated 2D images for each of the viewpoints can be aggregated and mapped to reconstruct a 3D virtual voxel grid 345 surrounding the specimen container 102. Each pixel has a defined location in a 2D virtual grid, which than can be projected onto the 3D virtual voxel grid 345 from the three directions to generate the 3D model in 517. Grids from the 2D perspective are aligned with the 3D virtual voxel grid 345 based upon calibration information between the camera 440A-440C and pose for each viewpoint. Some redundancy (overlap) between the edge structures of each 2D grids may be present. The classes, having been assigned for each consolidated 2D image data set, may be grouped together for each viewpoint to form regions of: serum or plasma portion 212SP, settled blood portion 212SB, gel separator 313 (if present), air 212A, tube 212T, label 218, and possibly even cap 214, for each viewpoint. Voxels of each respective region are traversed onto the 3D virtual voxel grid 345, and if the classes are consistent between the adjacent viewpoints then the pixels in the overlapping region are assigned the common class.

As a result, the various regions are mapped to the 3D model and each region can be quantified using the calibration information and measurements from the 3D virtual voxel grid 345. The region locations of the 3D model may be used to determine where to place the aspiration probe tip so that no air 212A or settled blood portion 212SB or gel separator 313 are aspirated.

Once the liquid region is identified in 518, a presence of an interferent (e.g., H, I, and/or L) therein may be determined by operating on the 2D data sets of the liquid region with one or more interferent classifiers. In one embodiment, a separate classifier may be used for each of H, I, and L as described in co-pending U.S. Provisional Patent Application No. 62/288,375 entitled "Methods and Apparatus for Detecting an Interferent in a Specimen," filed Jan. 28, 2016. It should also be recognized that averaged values may also be used to provide HIL index values (Havg, Iavg, Lavg) in 521 that may be used to provide interferent levels for the specimen 212 as an average of the multiple viewpoints. In this way, one consistent classification may be obtained for H, I, L, or N for the 3D model.

At the quality check module 130, 430, 430A, 430B, a presence of an artifact (e.g., clot, bubble, and/or foam) may be determined by operating on the 2D data sets of the liquid region in 522 with one or more artifact classifiers. If multiple viewpoints, each viewpoint may be used to generate an area for that particular view. The areas of the artifacts from the various viewpoints may then be used to determine an estimated volume of the artifact. 2D images may be used to triangulate structures in 3D where volume may be derived from geometric computation. An estimated volume of the artifacts may be subtracted from the volume VSP, so that a better estimate of the available liquid is provided. The various viewpoints can be used to project the location of the artifact onto the virtual 3D voxel grid and the dimensions from each 2D projection can be used to even better estimate the volume and 3D location of the artifact.

Accordingly, it should be apparent that the model-based quantification method 500 carried out by the quality check module 130, 430, 430A, 430B herein may result in a rapid quantification of the serum or plasma portion 212SP and/or the settled blood portion 212SB of the specimen 212. Final results and determinations can be aggregated across the multiple viewpoints and displayed as a 3D model.

Figure 6:
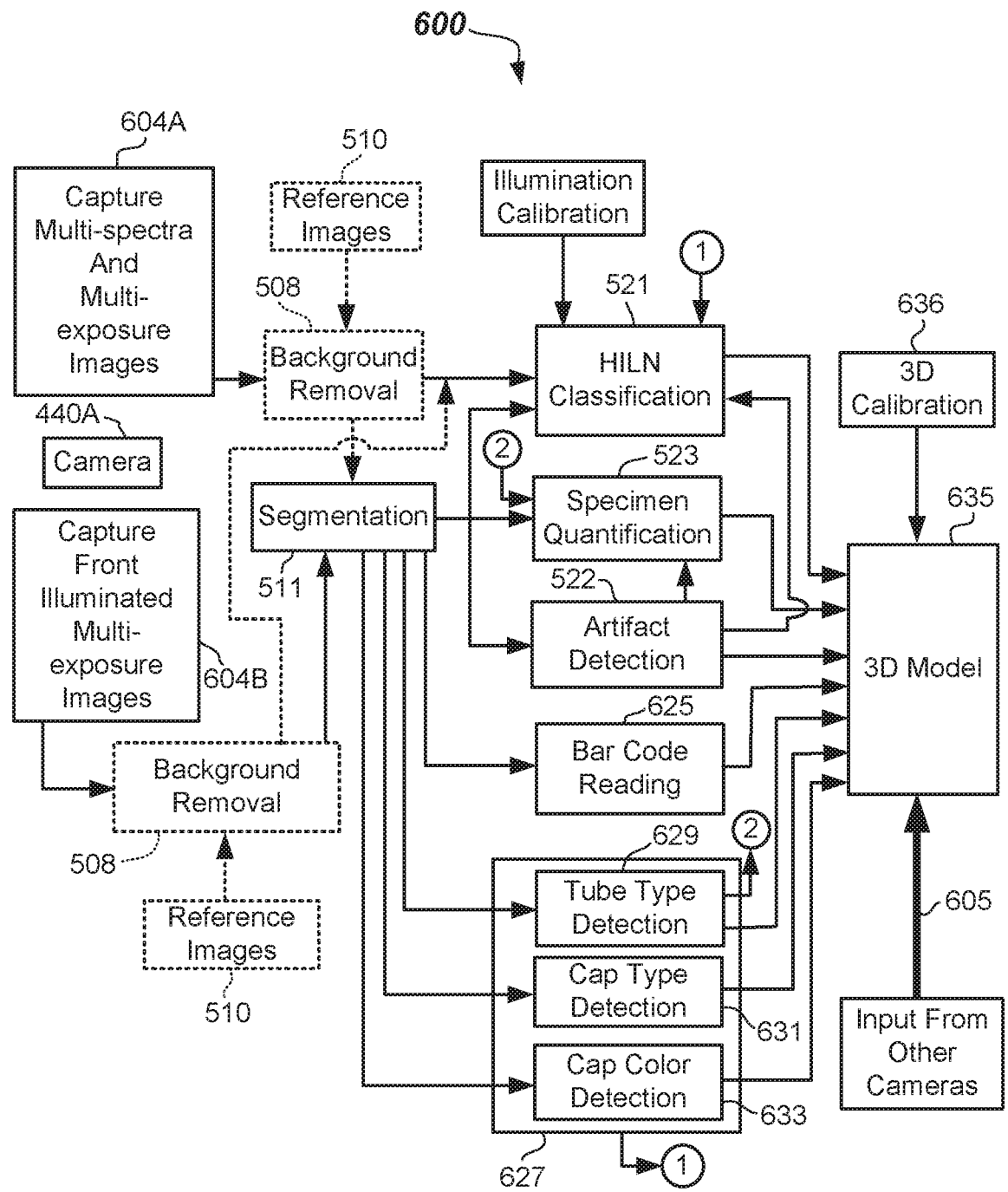
FIG. 6 illustrates a block diagram of functional components of a specimen testing apparatus including capability to characterize a specimen and specimen container according to one or more embodiments.

FIG. 6 illustrates a flowchart of a characterization method 600 wherein many items may be characterized using the quality check module 130, 430, 430A, 430B. According to one or more embodiments of the method 600, images are captured, such as by multiple cameras (camera 440A is shown). Cameras 440B, 440C may be used to capture images from other viewpoints. The processing that will be described for the images captured on camera 440A is identical for the other cameras 440B, 440C at the other viewpoints and their inputs in line 605 may be used to develop a 3D model 635 of the specimen 212 used for final determinations or for resolving any differences between the various viewpoints.

The images captured by camera 440A and the other cameras 440B, 440C may be multi-spectral (e.g., RGB images) and multi-exposure images, as discussed above. In particular, multiple exposures (e.g., 4-8 or more exposures or more) may be taken for each wavelength of light used in 604A at each viewpoint. The respective images at each exposure for each camera 440A-440C may be obtained simultaneously using monochrome cameras and backlighting by light panel assemblies 450A-450C as described in FIGS. 4A, 4D, 4E-4G. Optionally, or in addition, front illuminated multi-exposure images using a white light sources of light panel assemblies 450E, 450F of FIG. 4G may be obtained in 604B using a color camera.

Optionally, more than one quality check module may be used. For example quality check module 430B may be used for quantification and quality check module 430A may be used for HILN detection. However, either one of the quality check modules may be used for quantification and HILN detection.

The images may then be optionally processed in 508 to remove background using reference images 510, as described above in an optional background removal method. The images may then be further processed to determine segmentation in 511 in the manner described above. In some embodiments, the images from front lit cameras in 604B may be best used for segmentation in 511. Likewise, any images captured in 604A may be best used for characterization of HILN in 521. However, clearly, images captured in 604A could be used for segmentation in 511, and images captured in 604B could be used for HILN detection in 521.

Identifying and quantification of the specimen 212 in 523 in accordance with the methods described herein may also be carried out following segmentation in 511. Quantifying the specimen 212 in 523 may involve the determination of certain physical dimensional characteristics of the specimen 212 such as a physical locations of LA, SB, SG, and/or BG, and/or determination of HSP (depth of the serum or plasma portion 212SP), HSB (depth of the settled blood portion 212SB), and/or HTOT, and/or a volume of the serum or plasma portion (VSP) in 528 and/or a volume of the settled blood portion (VSB) in 534 as discussed above. The inner width (Wi) may be obtained from the specimen container characterization in 526.

To provide an even closer measurement of the actual volume of serum or plasma portion 212SP that is available for testing, or simply to flag the presence of an artifact, an artifact detection method may be employed in 522 to identify a presence of clot, bubble, or foam in the serum or plasma portion 212SP. The respective estimated volume of the one or more artifacts present may be subtracted from the estimated volume of the serum or plasma portion VSP determined in 528 to obtain a better volume estimate. The 2D image data for each viewpoint may be processed in 522 using artifact classifiers to determine the presence or absence of an artifact in the serum or plasma portion 212SP. The pixels identified as being an artifact by artifact detection 522 may then be ignored in the quantification method described herein, but may also be ignored in the HILN classification in 521, so as not to skew the results. Detection of an artifact may also initiate remediation in some embodiments. Artifact detection, such as provided in 521, is described in U.S. Provisional Patent Application No. 62/288,358 filed on Jan. 28, 2016, and entitled "Methods And Apparatus For Classifying An Artifact In A Specimen."

The results of the segmentation in 511 can also be used to identify the label 218, which may include the identifying information 215, such as a barcode. The barcode may be read in 625 to identify the specimen 212. Conventional barcode reading software may be used once the label 218 is identified in the segmentation in 511. If a particular image does not contain enough of the barcode to be read, the barcode can be read from, or in conjunction with the data from other images obtained from other viewpoints.

Further characterization of the specimen container 102 may also be accomplished according to the broader method 600 in 627. The characterization of the tube type in 629, cap type in 631 and cap color in 633 from the various viewpoints may be supplied and enable the generation of the 3D model in 635. The data from the various views may be compared so as to verify that the same characterization was achieved based on processing the images from each viewpoint (e.g., from cameras 440A-440C). If slightly different values are obtained, then the values may be averaged or otherwise aggregated. All of the outputs from the HILN classification in 521, specimen quantification in 523, artifact detection in 522, and specimen container detection in 627 may be used to generate the 3D model 635. The 3D model 635 may be used for final decision making, characterization, and/or harmonization of the results from the various 2D viewpoints (e.g., cameras 440A-440C). 3D calibration in 636 may include coordinating the positions of the various viewpoints to the 3D space. A 3D virtual voxel grid may be used for coordination of the 2D to 3D views.

Figure 7:
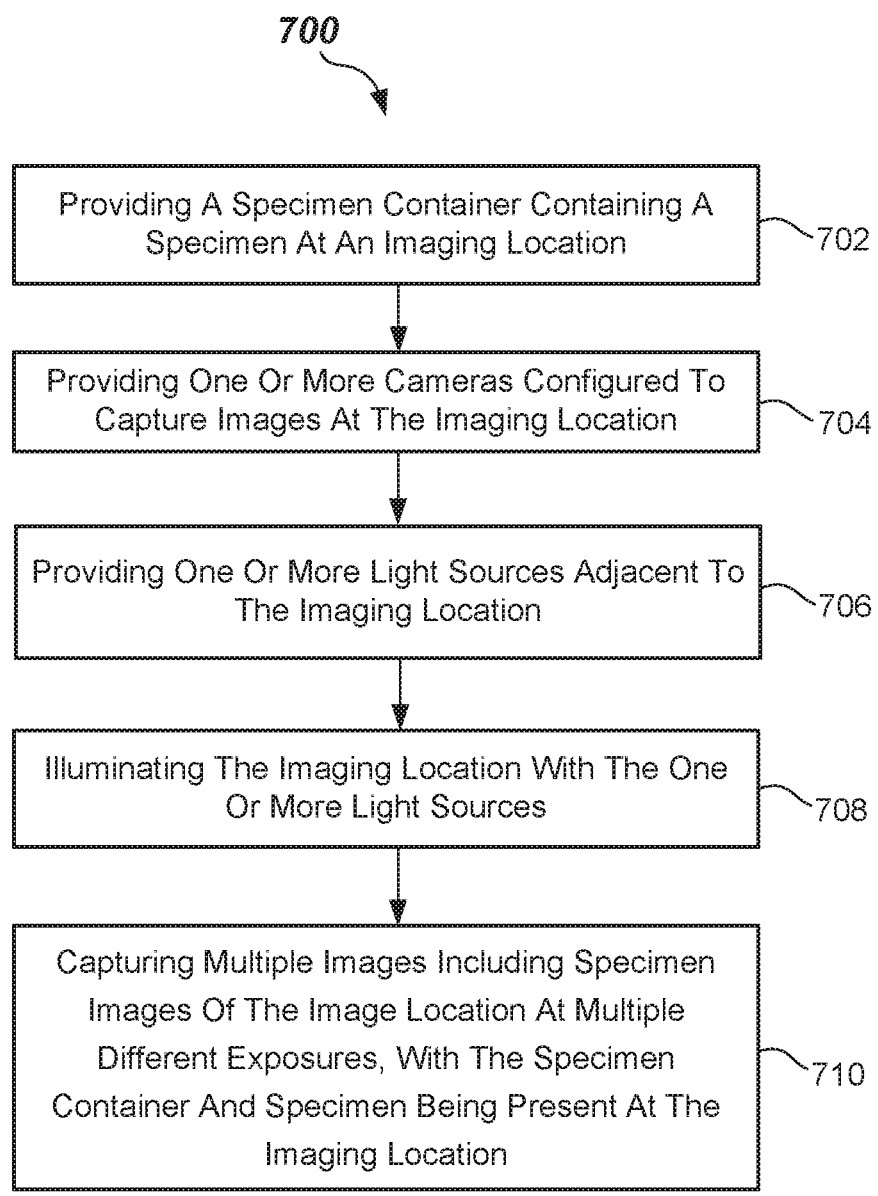
FIG. 7 is flowchart of a method of imaging a specimen container and specimen according to one or more embodiments.

FIG. 7 illustrates a flowchart of a method of imaging a specimen container and/or contents according to one or more embodiments. The method 700 includes, in 702, providing a specimen container (e.g., specimen container 102, such as a capped blood collection tube) containing a specimen (e.g., specimen 212) at an imaging location (e.g., imaging location 441). Imaging location 441 may be inside of a quality check module 130, 430, 430A, 430B. The specimen container (e.g., specimen container 102) may be placed at the imaging location (e.g., imaging location 441) by being transported thereto on a track (e.g., track 121) or being placed there by a robot (e.g., robot 124 or the like).

The method 700 includes, in 704, providing one or more cameras (e.g., cameras 440, 440A-440C) that are configured to capture images at the imaging location (e.g., imaging location 441), and, in 706, providing one or more light sources (e.g., light panel assemblies 450, 450A, 450B, 450W) configured to provide illumination for the one or more cameras (e.g., cameras 440, 440A-440C).

The method 700 includes, in 708, Illuminating the imaging location (e.g., imaging location 441) with the one or more light sources (e.g., light panel assemblies 450, 450A, 450B, 450W), and, in 710, capturing multiple images. The multiple images may be of the imaging location and taken at multiple different exposures (e.g., exposure times) with the specimen container (e.g., specimen container 102) and specimen (e.g., specimen 212) being present at the imaging location. The multiple images may be taken with the one or more cameras at multiple different spectra. In some embodiments, the spectra may not overlap each other, while in other some overlap is possible.

The capturing multiple images in 710 may be at different exposures (e.g., exposure times) as well as at the different wavelengths. For example, there may be 4-8 or more different exposures taken at different exposure times in some embodiments, but each image may be taken under the same lighting intensity. In one or more embodiments, some images may be captured using white light and using back lighting and light filtering using a filter assembly (e.g., filter assembly 463). In other embodiments, images may be captured using a plurality of narrow-band light sources including a particular spectra having a nominal wavelength, such as red, green, and blue. These may be provided by light panel assemblies 450-450F providing backlit light sources in some embodiments. In other embodiments, white light elements may be used in lighting panel assembly 450W. The white light images may be resolved into R, G, and B images as captured by the computer 143, as discussed above. In each instance, the images may be taken by multiple cameras 440A-440C from multiple viewpoints.

The method may include background removal to subtract some of the background information in order to accommodate for ambient light present. Background removal may be accomplished by subtracting reference data (e.g., dark reference data) from corresponding specimen images. Dark reference images may be taken at the same exposure times as for the images of the specimen container 102, but may be captured without a specimen container 102 in the carrier 122. However, other exposure times may be used, given the values are normalized for exposure time.

The method 700 includes providing classified 2D data sets obtained by processing the plurality of 2D image data sets from the multiple viewpoints. The classified 2D data sets being classified as one or more of serum or plasma, settled blood portion, gel separator (if present), air, tube, label, and even cap, background, or carrier.

The method 700 may include correlating locations in the classified 2D data sets to a consolidated 3D data set. In this manner, a 3D model may be formed (e.g., constructed) based upon the classified 2D data set that have been obtained from the various viewpoints. Correspondence between the segmentation of the various viewpoints may be confirmed with the 3D model. In some embodiments, the consolidated 3D model generated from the multiple 2D data sets may be used to provide a final result in regards to characterization of a presence or absence (normal—N) of an interferent (H, I, and/or L). If an interferent is detected, an interferent level may be assessed and reported based upon the consolidated data. Likewise, the consolidated 3D model generated from the multiple 2D data sets may be used to provide a final result in regards to characterization of a presence or absence of an artifact (clot, bubble, foam). The results of the 2D data sets or 3D model may be displayed or reported in any suitable manner or format, such as by displaying a 3D colored image on a display screen, providing a colored printout, displaying or providing a data sheet of values determined by the imaging, or the like.

While the quality check module 130 has been shown in FIG. 1 as being located such that the characterization is performed immediately after centrifugation on the centrifuge 125, it may be advantageous to include this feature directly on an analyzer (e.g., analyzer 106, 108, and/or 110) in some embodiments, or elsewhere in the specimen testing apparatus 100. For example, stand-alone analyzers at remote station 132 that are not physically connected to the track 121 of the specimen testing apparatus 100 could use this technique and quality check module 130 to characterize specimens 212 prior to analysis. Furthermore, in some embodiments, the centrifugation may be performed prior to loading the racks 104 into the loading area 105, so that in some embodiments, the quality check module 130 may be located at the loading area 105 and the quality check can be carried out as soon as the robot 124 loads a specimen container 102 into a carrier 122. The quality check modules 130, 430, 430A, 430B are generally interchangeable and may be used at any desired location about the track 121 or even as a stand-alone station that is visited by each specimen container 102 prior to being placed into the loading area.

While the invention is susceptible to various modifications and alternative forms, specific system and apparatus embodiments and methods thereof have been shown by way of example in the drawings and are described in detail herein. It should be understood, however, that it is not intended to limit the invention to the particular apparatus or methods disclosed but, to the contrary, the intention is to cover all modifications, equivalents, and alternatives falling within the scope of the invention.

What is claimed is:

1. A method of imaging a specimen container and/or specimen, comprising:
providing a specimen container containing a specimen at an imaging location;
providing one or more cameras configured to capture images at the imaging location;
providing one or more light panel assemblies adjacent to the imaging location;
illuminating the imaging location with the one or more light panel assemblies; and
capturing multiple images including:
specimen images of the imaging location at multiple different exposures, with the specimen container and specimen being present at the imaging location.

2. The method of claim 1, wherein the specimen images are captured while being sequentially illuminated by multiple different spectra.

3. The method of claim 1, wherein the capturing multiple images includes capturing multiple spectral reference images of the image location without the specimen container and specimen being present thereat.

4. The method of claim 3 comprising selecting optimally-exposed pixels from the multiple spectral reference images at multiple different exposures and normalizing to a selected optimal exposure time.

5. The method of claim 1, wherein the capturing multiple images includes capturing multiple dark reference images of the image location without the specimen container and specimen being present thereat, and with the one or more light panel assemblies being turned off and comprising selecting optimally-exposed pixels from the multiple dark reference images at multiple different exposures and normalizing to a selected optimal exposure time.

6. The method of claim 1, comprising selecting optimally-exposed pixels from the multiple different exposures.

7. The method of claim 6, comprising normalizing the optimally-exposed pixels to a selected optimal exposure time.

8. The method of claim 1, comprising providing:
a plurality of cameras configured to capture images at the imaging location, and providing a plurality of light panel assemblies adjacent to the imaging location.

9. The method of claim 1, wherein the illuminating the imaging location comprises illuminating with a spectrally-switchable light panel assembly that is switchable between multiple spectra.

10. The method of claim 9, wherein the spectrally-switchable light panel assembly includes lighting elements configured to emit different spectra.

11. The method of claim 1, wherein the one or more light panel assemblies comprise broadband lighting elements, and the capturing multiple images includes filtering with a filter assembly including individually selectable band-pass filters.

12. The method of claim 1, wherein the one or more cameras configured to capture images comprise at least one spectrally-selective camera.

13. The method of claim 1, comprising calculating a transmittance image data set for each viewpoint of the one or more cameras.

14. The method of claim 13, wherein the calculating of the transmittance image data set is based upon at least:
normalized spectral reference images, and
normalized specimen images.

15. The method of claim 13, wherein the calculating of the transmittance image data set is at least based upon normalized dark reference images.

16. The method of claim 13, comprising processing the transmittance image data set to characterize the specimen container and/or characterize the specimen for each viewpoint.

17. The method of claim 13, comprising classifying the specimen and/or specimen container based upon the transmittance image data set for each viewpoint.

18. A method of imaging a specimen container and/or specimen, comprising:
providing a specimen container containing a specimen at an imaging location;
providing one or more cameras configured to capture images at the imaging location;
providing one or more light sources adjacent to the imaging location;
illuminating the imaging location with the one or more light sources; and
capturing multiple images including:
specimen images of the imaging location at multiple different exposure times, with the specimen container and specimen being present at the image location; and
multiple dark reference images of the image location without the specimen container and specimen being present thereat, and with the one or more light sources being turned off.

19. A method of imaging a specimen container and/or specimen, comprising:
providing a specimen container containing a specimen at an imaging location;
providing one or more cameras configured to capture images at the imaging location;
providing one or more light sources adjacent to the imaging location;
illuminating the imaging location with the one or more light sources; and
capturing multiple images including:
specimen images of the imaging location at multiple different exposure times, with the specimen container and specimen being present at the image location; and
dark reference images and spectral reference images before capturing the specimen images.

20. A method of imaging a specimen container and a specimen, comprising:
providing a specimen container containing a specimen at an imaging location;
providing three cameras spaced about the imaging location and configured to capture images of the specimen container containing the specimen;
providing three panelized light sources adjacent the imaging location, each of the panelized light sources configured to illuminate the specimen container and the specimen with different colors of light;
sequentially illuminating the specimen container and the specimen with the three panelized light sources; and
capturing multiple images of the specimen container and the specimen from different viewpoints and at different exposures for each of the colors of light illuminating the specimen container and the specimen for each viewpoint.

21. A method of imaging a specimen container and/or specimen, comprising:
- providing a specimen container containing a specimen at an imaging location;
- providing one or more cameras configured to capture images at the imaging location;
- providing one or more light sources adjacent to the imaging location;
- illuminating the imaging location with the one or more light sources; and
- capturing multiple images including:
  - specimen images of the imaging location at multiple different exposures, with the specimen container and specimen being present at the imaging location; and
  - spectral reference images of the image location without the specimen container and specimen being present thereat.

22. A method of imaging a specimen container and/or specimen, comprising:
- providing a specimen container containing a specimen at an imaging location;
- providing one or more cameras configured to capture images at the imaging location;
- providing one or more light sources adjacent to the imaging location;
- illuminating the imaging location with the one or more light sources;
- capturing multiple images including specimen images of the imaging location at multiple different exposures with the specimen container and specimen being present at the imaging location;
- selecting optimally-exposed pixels from the multiple different exposures; and
- normalizing the optimally-exposed pixels to a selected optimal exposure time.

23. A method of imaging a specimen container and/or specimen, comprising:
- providing a specimen container containing a specimen comprising at least a serum or plasma portion at an imaging location;
- providing one or more cameras configured to capture images at the imaging location;
- providing one or more spectrally-switchable light panel assemblies adjacent to the imaging location, the one or more spectrally-switchable light panel assemblies being switchable between multiple spectra and including lighting elements configured to emit different spectra;
- illuminating the imaging location with the one or more spectrally-switchable light panel assemblies; and
- capturing multiple images including specimen images of the imaging location at multiple different exposures, with the specimen container and specimen being present at the imaging location.

24. A method of imaging a specimen container and/or specimen, comprising:
- providing a specimen container containing a specimen comprising at least a serum or plasma portion at an imaging location;
- providing one or more cameras configured to capture images at the imaging location;
- providing one or more light sources adjacent to the imaging location;
- illuminating the imaging location with the one or more light sources;
- capturing multiple images including specimen images of the imaging location at multiple different exposures, with the specimen container and specimen being present at the imaging location; and
- calculating a transmittance image data set for each viewpoint of the one or more cameras.

* * * * *